(12) United States Patent
Kuma et al.

(10) Patent No.: US 8,356,528 B2
(45) Date of Patent: Jan. 22, 2013

(54) TRANSMISSION FOR INDUSTRIAL VEHICLE

(75) Inventors: Masaaki Kuma, Hakusan (JP); Hiroaki Takeshima, Komatsu (JP)

(73) Assignee: Komatsu Ltd., Tokyo (JP)

( * ) Notice: Subject to any disclaimer, the term of this patent is extended or adjusted under 35 U.S.C. 154(b) by 810 days.

(21) Appl. No.: 12/521,018

(22) PCT Filed: Feb. 12, 2008

(86) PCT No.: PCT/JP2008/052227
§ 371 (c)(1),
(2), (4) Date: Jun. 24, 2009

(87) PCT Pub. No.: WO2008/114547
PCT Pub. Date: Sep. 25, 2008

(65) Prior Publication Data
US 2010/0018336 A1   Jan. 28, 2010

(30) Foreign Application Priority Data
Mar. 20, 2007   (JP) .................................. 2007-071970

(51) Int. Cl.
*F16H 3/08* (2006.01)
(52) U.S. Cl. ................ 74/330; 74/329; 74/331
(58) Field of Classification Search .................... 74/329, 74/330, 331, 333, 340, 404
See application file for complete search history.

(56) References Cited

U.S. PATENT DOCUMENTS

| | | | | |
|---|---|---|---|---|
| 3,858,455 A | * | 1/1975 | Sisson et al. | 74/360 |
| 3,893,345 A | * | 7/1975 | Sisson et al. | 74/331 |
| 3,916,710 A | * | 11/1975 | Sisson et al. | 74/331 |
| 3,916,714 A | * | 11/1975 | Sisson et al. | 74/331 |
| 4,031,762 A | * | 6/1977 | Shellberg | 74/15.63 |
| 4,226,135 A | * | 10/1980 | Winter | 74/330 |
| 5,493,927 A | * | 2/1996 | Botterill et al. | 74/331 |
| 6,513,399 B2 | * | 2/2003 | Lamela | 74/331 |
| 6,712,734 B1 | * | 3/2004 | Loeffler | 477/5 |
| 6,845,682 B1 | * | 1/2005 | Bulgrien | 74/331 |
| 6,988,426 B2 | * | 1/2006 | Calvert | 74/331 |
| 7,730,807 B2 | * | 6/2010 | Kim et al. | 74/745 |

FOREIGN PATENT DOCUMENTS

| | | |
|---|---|---|
| JP | 2680708 B2 | 8/1997 |
| JP | 2690787 B2 | 8/1997 |
| JP | 2565596 Y2 | 12/1997 |
| JP | 2001-099246 A | 4/2001 |
| JP | 2005-282830 A | 10/2005 |

\* cited by examiner

*Primary Examiner* — Troy Chambers
*Assistant Examiner* — Michael Gonzalez
(74) *Attorney, Agent, or Firm* — Global IP Counselors

(57) ABSTRACT

A transmission for an industrial vehicle has an input shaft; first and second transmission mechanisms each having a plurality of speed-change steps; a second transmission mechanism; a clutch mechanism; a rotation direction switching mechanism; and an output shaft. The clutch mechanism is disposed on the input side of the first and second transmission mechanisms and is provided with a forward clutch and a reverse clutch for switching between forward and reverse travel, and is further provided with first and second snap clutches for selecting which of the first and second transmission mechanisms will receive rotational input from the engine. The rotation direction switching mechanism is a mechanism for switching the direction of rotation inputted to the first transmission mechanism or the second transmission mechanism to the direction of rotation for forward travel or the direction of rotation for reverse travel in accordance with the switching of forward and reverse travel.

4 Claims, 16 Drawing Sheets

TRANSMISSION FOR INDUSTRIAL VEHICLE

CROSS-REFERENCE TO RELATED APPLICATIONS

This application claims priority to Japanese Patent Application No. 2007-071970, filed on Mar. 20, 2007. The entire disclosures of Japanese Patent Application No. 2007-071970 are hereby incorporated herein by reference.

TECHNICAL FIELD

The present invention relates to a transmission for an industrial vehicle, particularly to a transmission for an industrial vehicle for changing and outputting the speed of rotation from the engine while capable of multiple speed changes during forward and reverse travel.

BACKGROUND ART

A hydraulic transmission such as that disclosed in Japanese Laid-Open Patent Application No. 2005-282830 is commonly provided as a transmission for a wheel loader or another industrial vehicle. This type of transmission has a torque converter disposed between the engine and the transmission body. Disposed inside the transmission body are a hydraulic clutch for forward travel and a hydraulic clutch for reverse travel whereby a switch is made between forward and reverse travel, as well as hydraulic clutches for a plurality of speed-change steps that can operate in forward and reverse.

With such a transmission, the hydraulic clutch for forward travel is engaged (brought into a power transmission state) and the hydraulic clutch for reverse travel is disengaged (brought into a power cutoff state) during forward travel, after which the hydraulic clutch of the corresponding speed-change step is engaged so that a suitable speed-change step is selected in accordance with the travel state or the like. Conversely, the hydraulic clutch for forward travel is disengaged and the hydraulic clutch for reverse travel is engaged during reverse travel, after which the hydraulic clutch of the corresponding speed-change step is engaged so that a suitable speed-change step is selected in accordance with the travel state or the like.

In a passenger vehicle, on the other hand, a twin-clutch transmission for a vehicle is provided for rapidly switching speeds (e.g., Japanese Laid-Open Patent Application No. 2001-99246). The transmission shown in Japanese Laid-Open Patent Application No. 2001-99246 has a first transmission mechanism for odd-numbered speeds, a second transmission mechanism for even-numbered speeds, and first and second clutch mechanisms provided in correspondence to the respective transmission mechanisms.

In such a configuration, it is possible to rapidly change speed from an odd-numbered speed-change step to an even-numbered speed-change step because the speed change can be prepared (pre-shifted) in the second transmission mechanism for even-numbered speeds when the vehicle is travelling in an odd-numbered speed, for example.

SUMMARY OF THE INVENTION

A conventional transmission for an industrial vehicle generally uses a torque converter and a plurality of hydraulic clutches, as shown in Japanese Laid-Open Patent Application No. 2005-282830. The torque converter has poor power transmission because power is transmitted using a fluid. Also, a conventional transmission has a hydraulic clutch provided to each speed-change step, so the configuration is complex, and the configuration of the oil lines for providing hydraulic pressure to the hydraulic clutch is complicated.

Therefore, it is possible to consider using a configuration such as that shown in Japanese Laid-Open Patent Application No. 2001-99246, which is used as a transmission for a passenger vehicle, in a transmission for a wheel loader or another industrial vehicle.

However, in a transmission for an industrial vehicle, the reverse-movement side is similar to the forward-movement side in that a plurality of speed-change steps is required in the same manner as during forward travel, and a configuration such as that shown in Japanese Laid-Open Patent Application No. 2001-99246 cannot be used without modification.

An object of the present invention is to provide a transmission for an industrial vehicle that has a simple configuration and good efficiency.

The transmission for an industrial vehicle according to a first aspect is a transmission adapted to output rotation from an engine while enabling multiple speed changes during forward and reverse travel. The transmission includes an input shaft, a first transmission mechanism, a second transmission mechanism, a clutch mechanism, a rotation direction switching mechanism, and an output shaft. The input shaft receives rotation from the engine as input. The first transmission mechanism configured and arranged to change the speed of rotation from the input shaft among a plurality of speed steps. The second transmission mechanism, provided in parallel to the first transmission mechanism, is configured and arranged to change the speed of rotation from the input shaft among a plurality of speed steps. The clutch mechanism is disposed on the input side of the first and second transmission mechanisms and is provided with a forward clutch and a reverse clutch for switching between forward and reverse travel states; a first snap clutch for inputting the rotation from the engine to the first transmission mechanism; and a second snap clutch for inputting the rotation from the engine to the second transmission mechanism. The rotation direction switching mechanism is configured and arranged to switch a direction of rotation inputted to the first transmission mechanism or the second transmission mechanism to one of a direction of rotation for forward travel and a direction of rotation for reverse travel in accordance with the switch between the forward and reverse travel states by using the forward clutch and the reverse clutch. The output shaft is configured and arranged to output the rotation inputted from the first and second transmission mechanisms.

With this transmission, rotation from the engine is inputted to an input shaft. The forward clutch is engaged (brought into a power transmission state) during forward travel and the reverse clutch is disengaged (brought into a power cutoff state) during forward travel. The rotation from the input shaft is inputted to the first transmission mechanism or the second transmission mechanism selected by the first snap clutch and the second snap clutch. Conversely, the forward clutch is disengaged during reverse travel, the reverse clutch is engaged during reverse travel, and the rotation from the input shaft is inputted to the first transmission mechanism or the second transmission mechanism. In a case in which the speed is changed by input to the first transmission mechanism during forward or reverse travel, the first snap clutch is engaged and the second snap clutch is disengaged. Conversely, when the speed is changed by input to the second transmission mechanism, the first snap clutch is disengaged and the second snap clutch is engaged.

In this arrangement, the rotation direction switching mechanism sets the direction of rotation inputted to the transmission mechanisms to be the direction of rotation for forward travel during forward travel, and the direction of rotation inputted to the transmission mechanisms to be the direction of rotation for reverse travel during reverse travel.

In this arrangement, a plurality of speed-change steps can be obtained during both forward travel and reverse travel using a single set of transmission mechanisms by providing the pre-stage of the transmission mechanism with a clutch mechanism having a forward clutch and a reverse clutch as well as a first snap clutch and a second snap clutch. Each speed-change step of forward and reverse travel can be rapidly changed.

With the transmission mechanism having a configuration such as that described above, the configuration of the transmission mechanisms can be simplified in comparison with a conventional transmission because the transmission mechanisms can be generally configured using a dog clutch.

The transmission for an industrial vehicle according to a second aspect is the transmission for an industrial vehicle as recited in the first aspect, wherein one of the forward clutch and the reverse clutch, and one of the first snap clutch and the second snap clutch, are coaxially arranged as a first clutch pair. Also, the other of the forward clutch and the reverse clutch, and the other of the first snap clutch and the second snap clutch, are coaxially arranged as a second clutch pair.

Here, as an example, the forward clutch and the first snap clutch are coaxially arranged as a first clutch pair, and the reverse clutch and the second snap clutch are coaxially arranged as a second clutch pair.

In this case, a portion of the constituent members of the two clutches contained in each clutch pair can be shared and the configuration can be simplified. For example, when the clutches are hydraulic clutches, a portion of the clutch casing for accommodating the clutch plate can be shared. It is possible to avoid situations in which the occupied space in the horizontal and vertical directions orthogonal to the axial direction increases in size.

The transmission for an industrial vehicle according to a third aspect is the transmission for an industrial vehicle as recited in the second aspect, wherein the first and second transmission mechanisms have first and second speed-change shafts, respectively, arranged parallel to the input shaft; one of the first and second clutch pairs is arranged coaxially with the input shaft; and the other of the first and second clutch pairs is arranged coaxially with one of the first speed-change shaft and the second speed-change shaft.

Here, as an example, the first clutch pair is arranged coaxially with the input shaft, and the second clutch pair is arranged coaxially with the second speed-change shaft.

In this case, space in the horizontal and vertical directions can be made the same as that of a transmission for an industrial vehicle such as that described in Japanese Laid-Open Patent Application No. 2005-282830. In other words, in a conventional transmission, the input shaft, the first speed-change shaft, and the second speed-change shaft are provided, and a hydraulic clutch is arranged for each shaft. In the present invention, space in the horizontal and vertical directions is not increased even if the clutch mechanisms were to be provided with a hydraulic clutch configuration in the same manner as in the prior art because a clutch mechanism is merely provided to the input shaft and the first or second speed-change shaft.

The transmission for an industrial vehicle according to a fourth aspect is the transmission for an industrial vehicle as recited in the third aspect, wherein the rotation direction switching mechanism has a first gear train, a second gear train and a third gear train. The first gear train is configured and arranged to input rotation to the first clutch pair and the second clutch pair in the same direction. The second gear train is configured and arranged to transmit output between the first clutch pair and the second clutch pair so that the first clutch pair and the second clutch pair rotate in opposite directions. The third gear train is configured and arranged to transmit the output of the one of the first and second clutch pairs that is arranged coaxially with the input shaft to the other of the first and second speed-change shafts that is not coaxial with the other of the first and second clutch pairs so that the other of the first and second speed-change shafts rotates in an opposite direction from the one of the first and second clutch pairs.

In this arrangement, the rotation from the engine is inputted to the first clutch pair and the second clutch pair, and the direction of rotation inputted to the clutch pairs is set in the same direction as the first gear train. However, the mutual output rotations of the clutch pairs are given the opposite direction by the second gear train and transmitted to the counterpart side. The output rotation of the clutch pair disposed coaxially with the input shaft is furthermore made to rotate in the opposite direction by the third gear train and inputted to the speed-change shaft that is not coaxial with the two clutch pairs.

Here, as an example, the first clutch pair composed of the forward clutch and the first snap clutch is arranged coaxially with the input shaft, and the second clutch pair composed of the reverse clutch and the second snap clutch is arranged coaxially with the speed-change shaft of the second transmission mechanism. In this example, when the forward clutch is engaged and the reverse clutch is disengaged during forward travel, the engine rotation is inputted to the first and second transmission mechanisms via the following pathways.

Input to the First Transmission Mechanism During Forward Travel: First Snap Clutch Engaged Input shaft (direction of rotation: first direction)→first clutch pair (first direction)→third gear train (second direction=forward)→first transmission mechanism.

Input to the Second Transmission Mechanism During Forward Travel: Second Snap Clutch Engaged Input shaft (first direction)→first clutch pair (forward clutch: first direction)→second gear train (second direction) →second clutch pair (second direction=forward)→second transmission mechanism.

In this manner, the rotation in the second direction (forward direction) is transmitted to the first transmission mechanism and the second transmission mechanism.

On the other hand, the forward clutch is engaged and the reverse clutch is disengaged during reverse travel, and the engine rotation is inputted to the first and second transmission mechanisms via the following pathways.

Input to the First Transmission Mechanism During Reverse Travel: First Snap Clutch Engaged Input shaft (first direction)→first gear train (first direction) →second clutch pair (reverse clutch: first direction)→second gear train (second direction)→first clutch pair (first snap clutch: second direction)→third gear train (first direction=reverse)→first transmission mechanism.

Input to the Second Transmission Mechanism
During Reverse Travel: Second Snap Clutch
Engaged Input shaft (first direction)→first gear train (first direction)
→second clutch pair (reverse clutch+second snap clutch: first direction=reverse)→second transmission mechanism.

In this manner, the rotation in the first direction (reverse direction) is transmitted to the first transmission mechanism and the second transmission mechanism.

The transmission for an industrial vehicle according to a fifth aspect is the transmission for an industrial vehicle as recited in any of the first to fourth aspects, further comprising a main clutch device, disposed between the engine and the clutch mechanism, configured and arranged to transmit the rotation from the engine to the input shaft.

In this case, the engine power can be transmitted with good efficiency because the rotation from the engine is transmitted to the transmission mechanisms by a main clutch device rather than a torque converter. The main clutch device can control the clutch capacity by controlling the hydraulic pressure of the clutch in the case of a hydraulic clutch, for example. Therefore, engine stoppage under a rapid increase in load or at other times can be avoided by reducing the clutch capacity of the main clutch device.

DETAILED DESCRIPTION OF THE PREFERRED EMBODIMENTS

Overall Structure

Figure 1:
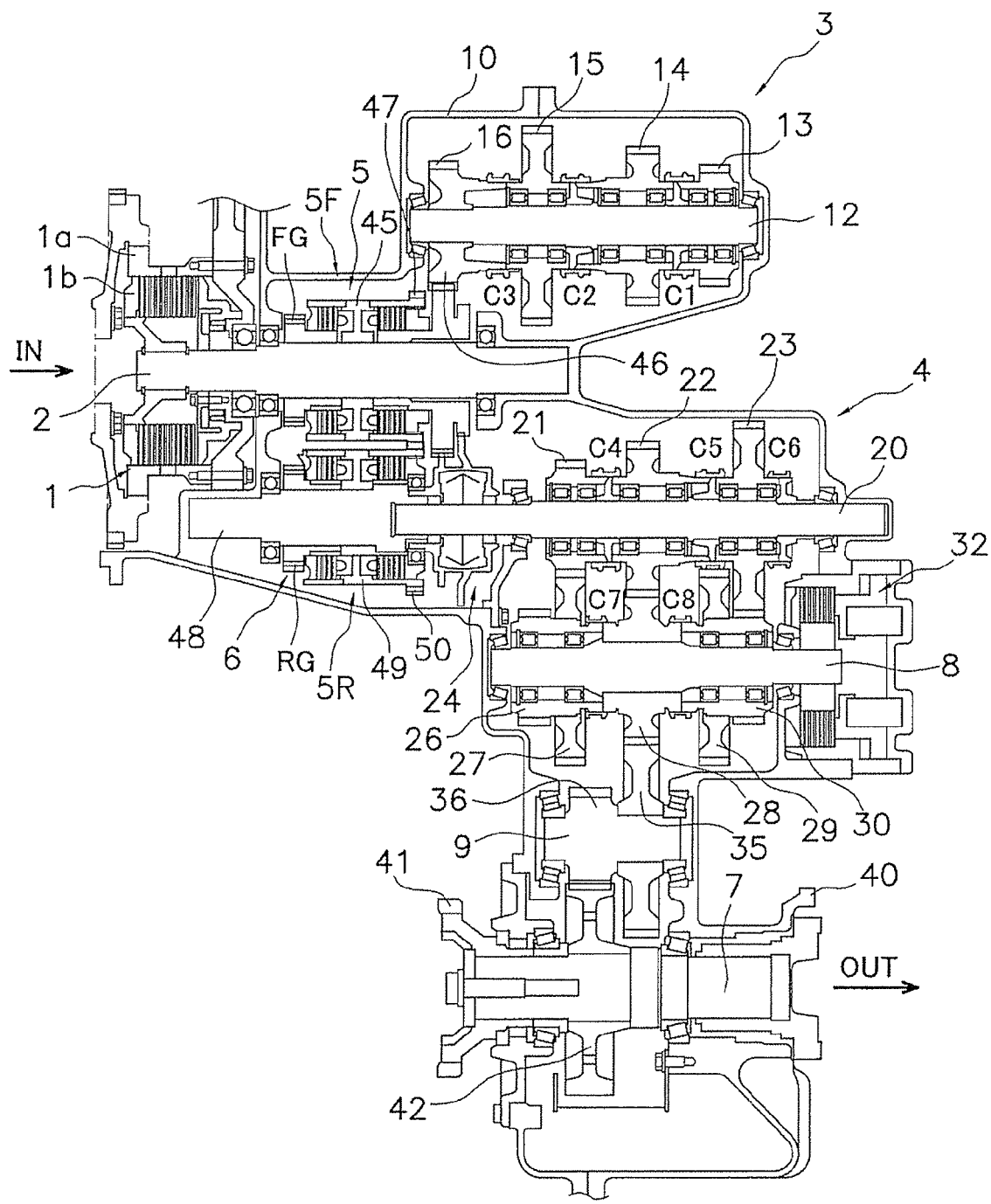
FIG. 1 is a cross-sectional development view of the transmission for a wheel loader according to an embodiment of the present invention.
Figure 2:
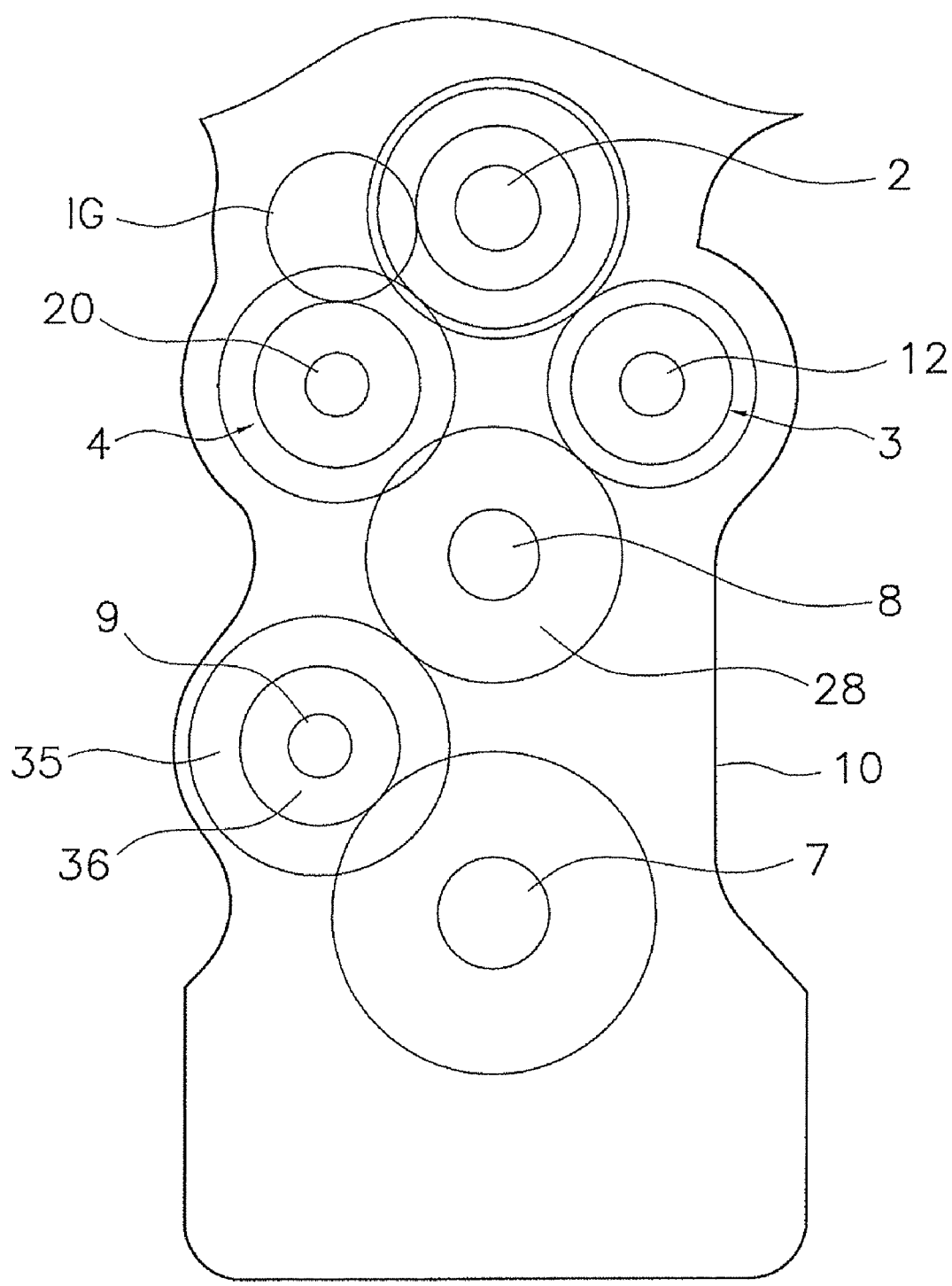
FIG. 2 is a view as seen from the rear of the transmission.
Figure 3:
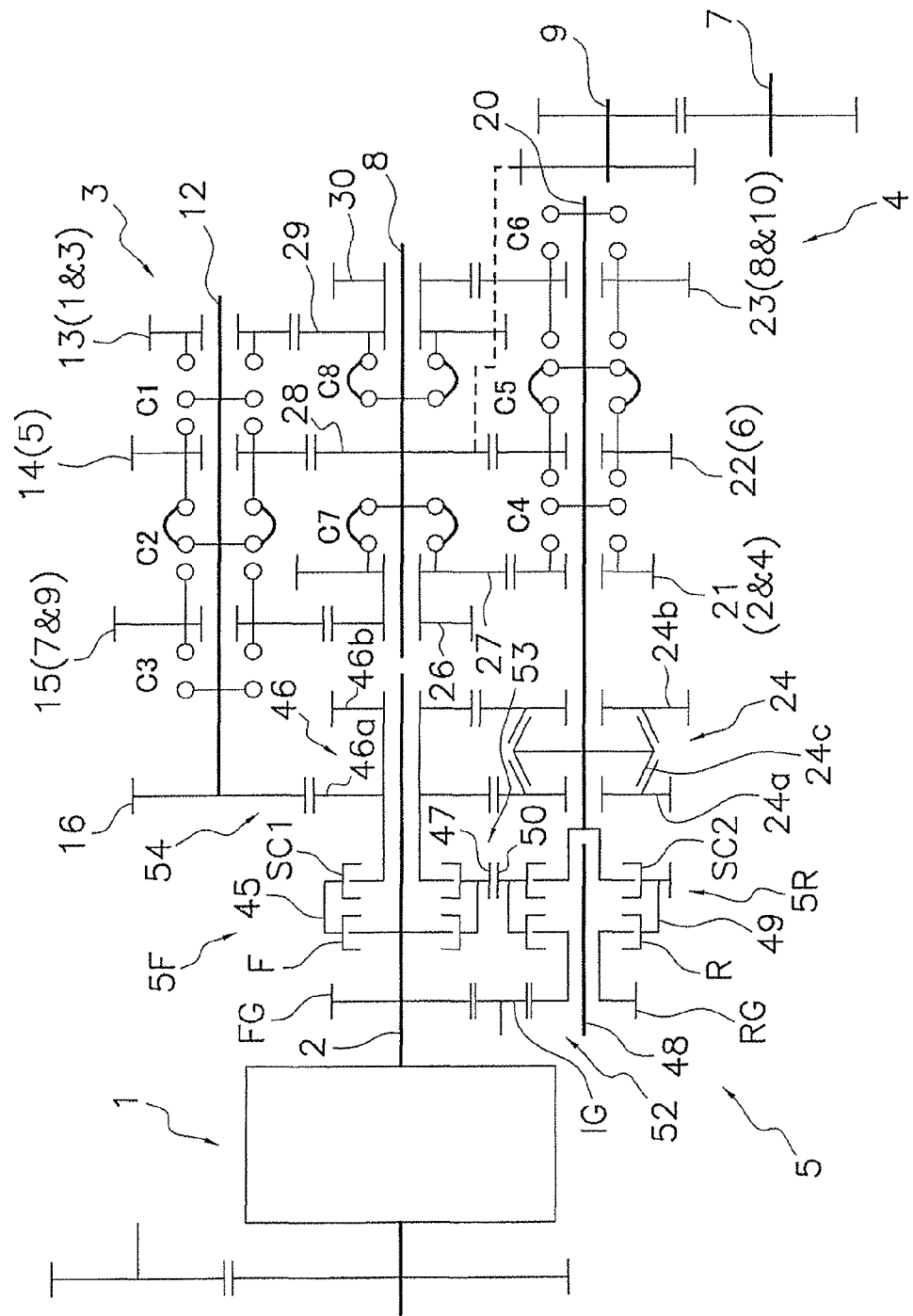
FIG. 3 is a skeleton view of the transmission.
Figure 4:
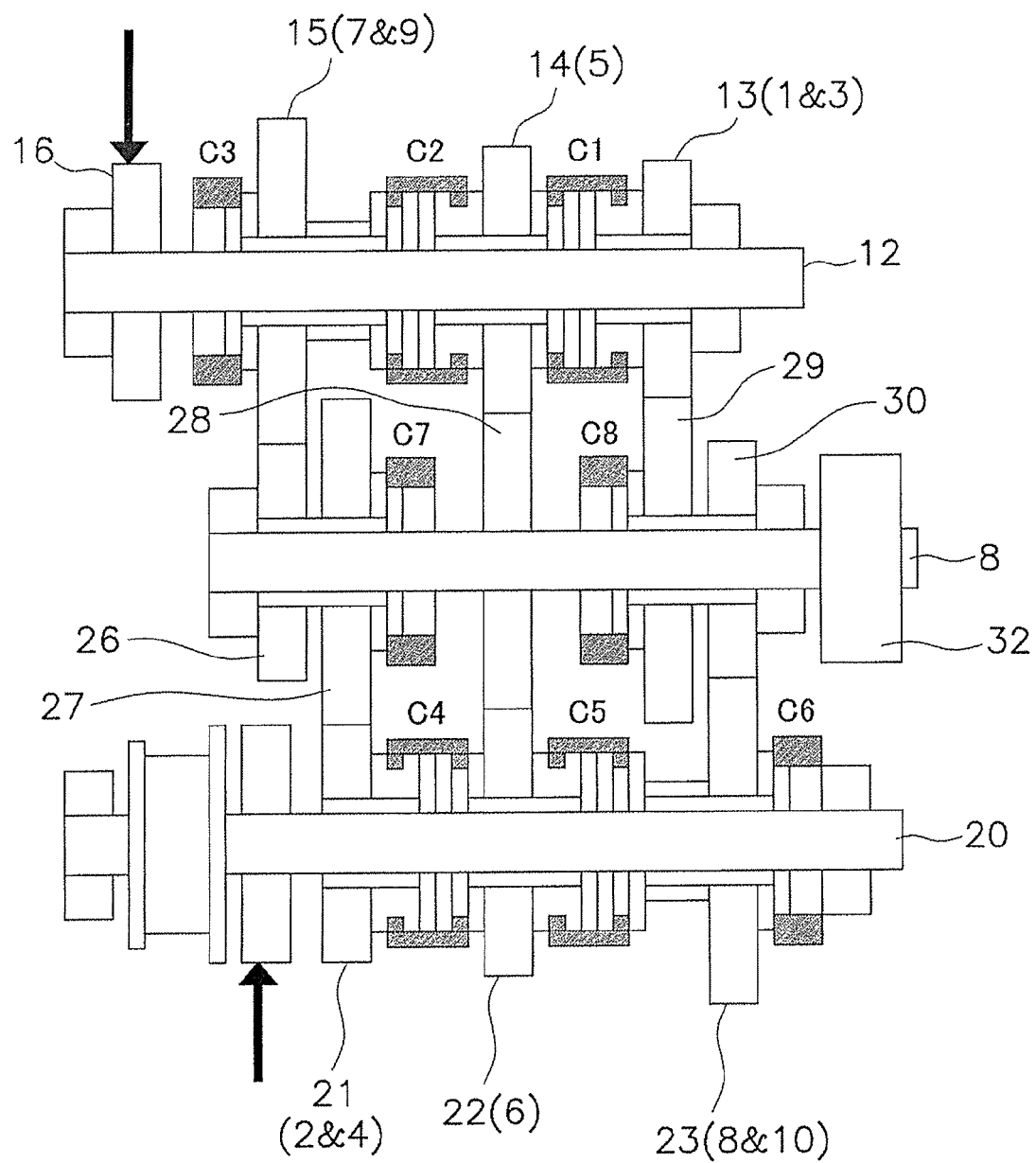
FIG. 4 is a schematic view showing the structure of the first transmission mechanism and the second transmission mechanism of the transmission.

FIG. 1 is a layout cross-sectional development view of the transmission according to an embodiment of the present invention. FIG. 2 is a schematic layout view of the shafts and the like as viewed from the rear of the transmission. FIG. 3 is a skeleton view of the present transmission. FIG. 4 is a schematic partial view of the transmission mechanism.

The transmission shown in FIG. 1 is installed, e.g., in a wheel loader, and is provided with ten speed-change steps for both forward and reverse travel. The transmission has a main clutch 1 to which rotation from the engine is inputted, an input shaft 2 to which the engine rotation is inputted via the main clutch 1, a first transmission mechanism 3, a second transmission mechanism 4, a clutch mechanism 5, a rotation direction switching mechanism 6, and an output shaft 7. A speed-changing idle shaft 8 and an output idle shaft 9 are disposed between the output shaft 7 and the first and second transmission mechanisms 3, 4.

Main Clutch

The main clutch 1 is a hydraulic clutch that can control the clutch capacity by controlling the hydraulic pressure of the clutch. The main clutch 1 has an input-side member 1a linked to an engine-side member, and an output-side member 1b linked to the input shaft 2. A power takeoff mechanism (not shown) for driving auxiliary equipment is linked to the input-side member 1a of the main clutch 1.

Input Shaft

The input shaft 2 is rotatably supported by a pair of bearings in a housing 10. The output-side member 1b of the main clutch 1 is linked by a spline to the distal end of the input shaft 2, and the input-side member 1a of the main clutch 1 is rotatably supported via a bearing.

First Transmission Mechanism

The first transmission mechanism 3 receives rotation as input when an odd-numbered step (1st and 3rd speeds, 5th speed, and 7th and 9th speeds) is selected from among ten speed-change steps; has a first speed-change shaft 12, first- and third-speed (hereinafter referred to as 1st- and 3rd-speed) drive gears 13, a fifth-speed (hereinafter referred to as 5th-speed) drive gear 14, seventh and ninth speed (hereinafter referred to as 7th- and 9th-speed) drive gears 15, and a reduction gear 16; and further has first to third dog clutches C1, C2, C3.

The first speed-change shaft 12 is offset from the input shaft 2, is disposed in parallel to the input shaft 2, and is rotatably supported by a pair of bearings in the housing 10. The 1st- and 3rd-speed drive gears 13, the 5th-speed drive gear 14, and the 7th- and 9th-speed drive gears 15 are each rotatably supported by a pair of bearings on the first speed-change shaft 12. The reduction gear 16 is nonrotatably mounted on the engine-side distal end of the first speed-change shaft 12.

The dog clutches C1 to C3 are clutches that move in the axial direction and are designed either to relatively nonrotatably fix the drive gears 13 to 15 to the first speed-change shaft 12 or to link two drive gears to each other.

Specifically, the first dog clutch C1 is a clutch for switching between engaging (linking) the first speed-change shaft 12 and the 1st- and 3rd-speed drive gears 13 with each other, engaging the 1st- and 3rd-speed drive gears 13 with the 5th-speed drive gear 14, and disengaging (not linking) these elements from each other. The second dog clutch C2 is a clutch for switching between engaging the first speed-change shaft 12 and the 5th-speed drive gear 14 with each other, engaging the 5th-speed drive gear 14 with the 7th- and 9th-speed drive gears 15, and disengaging these elements from each other. The third dog clutch C3 is a clutch for switching between engaging and disengaging the first speed-change shaft 12 and the 7th- and 9th-speed drive gears 15. The third dog clutch C3 is constantly kept in a state of being incapable of rotating relative to the first speed-change shaft 12, and the first and second dog clutches C1, C2 can assume a position in which the clutches are incapable of rotating relative to the first speed-change shaft 12, or a position in which the clutches are capable of rotating relative to the shaft.

Second Transmission Mechanism

The second transmission mechanism 4 receives rotation as input when an even-numbered step (second and fourth speeds, sixth speed, and eighth and tenth speeds) is selected from among ten speed-change steps; has a second speed-change shaft 20, second- and fourth-speed (hereinafter referred to as 2nd-and 4th-speed) drive gears 21, a sixth-speed (hereinafter referred to as 6th-speed) drive gear 22, and eighth and tenth speed (hereinafter referred to as 8th- and 10th-speed) drive gears 23; and also has fourth to sixth dog clutches C4, C5, C6.

The second speed-change shaft 20 is offset from the input shaft 2, is disposed in parallel to the input shaft 2 and the first speed-change shaft 12, and is rotatably supported by a pair of bearings in the housing 10. The 2nd- and 4th-speed drive gears 21, the 6th-speed drive gear 22, and the 8th- and 10th-speed drive gears 23 are each rotatably supported by a pair of bearings on the second speed-change shaft 20.

The fourth to sixth dog clutches C4, C5, C6 are clutches that move in the axial direction and are designed either to fix (make incapable of relative rotation) the drive gears 21 through 23 to the second speed-change shaft 20, or to link two drive gears to each other. The sixth dog clutch C6 is constantly kept in a state of being incapable of rotating relative to the second speed-change shaft 20, and the fourth and fifth dog clutches C4, C5 can assume a position in which the clutches are incapable of rotating relative to the second speed-change shaft 20, or a position in which the clutches are capable of rotating relative to the shaft.

Specifically, the fourth dog clutch C4 is a clutch for switching between engaging the second speed-change shaft 20 with the 2nd- and 4th-speed drive gears 21, engaging the 2nd- and 4th-speed drive gears 21 with the 6th-speed drive gear 22, and disengaging these elements from each other. The fifth dog clutch C5 is a clutch for switching between engaging the second speed-change shaft 20 and the 6th-speed drive gear 22, engaging the 6th-speed drive gear 22 with the 8th- and 10th-speed drive gears 23, and disengaging these elements from each other. The sixth dog clutch C6 is a clutch for switching between engaging and disengaging the second speed-change shaft 20 and the 8th- and 10th-speed drive gears 23.

A synchronizing mechanism 24 for ensuring a smooth meshing of the clutch during speed change is provided to the second speed-change shaft 20. The synchronizing mechanism 24 has a first synchronizing gear 24a and a second synchronizing gear 24b that are rotatably supported on the second speed-change shaft 20, and a cone clutch 24c for linking the synchronizing gears 24a, 24b and the second speed-change shaft 20 as shown in FIG. 3.

Speed-Changing Shaft

The speed-changing idle shaft 8 is rotatably supported by a pair of bearings in the housing 10 in the same manner as the speed-change shafts 12, 20. The speed-changing idle shaft 8 is disposed parallel to the shafts 12, 20 below the first and second speed-change shafts 12, 20 and on the same perpendicular line as the input shaft 2, as shown in FIG. 2. The speed-changing idle shaft 8 is provided with the seventh and eighth drive clutches C7, C8, as well as a driven gear that meshes with the drive gears provided to the first and second transmission mechanisms 3, 4. More specifically, first to fifth driven gears 26, 27, 28, 29, 30 are rotatably supported in sequence from the engine by the speed-changing idle shaft 8 via bearings. The first driven gear 26 and the second driven gear 27 are configured so as to integrally rotate with each other, and the fourth driven gear 29 and the fifth driven gear 30 are configured so as to integrally rotate with each other. The driven gear 26 constantly meshes with the 7th- and 9th-speed drive gears 15, the second driven gear 27 with the 2nd- and 4th-speed drive gears 21, the third driven gear 28 with the 5th-speed drive gear 14 and the 6th-speed drive gear 22, the fourth driven gear 29 with the 1st- and 3rd-speed drive gears 13, and the fifth driven gear 30 with the 8th- and 10th-speed drive gears 23, respectively.

The seventh and eighth dog clutches C7, C8 are clutches that move in the axial direction and are desired to relatively nonrotatably fix the driven gears to the speed-changing idle shaft 8. The seventh and eighth dog clutches C7, C8 are constantly kept in a state of being incapable of rotating relative to the speed-changing idle shaft 8.

Specifically, the seventh dog clutch C7 is a clutch for engaging or disengaging the speed-changing idle shaft 8 with or from the first and second driven gears 26, 27; and the eighth dog clutch C8 is a clutch for engaging or disengaging the speed-changing idle shaft 8 with or from the fourth and fifth driven gears 29, 30.

A parking brake 32 provided to the rear end (the end on the side opposite from the engine) of the speed-changing idle shaft 8.

Output Idle Shaft

The output idle shaft 9 is rotatably supported by a pair of bearings in the housing 10 in the same manner as other shafts. As shown in FIG. 2, the output idle shaft 9 is disposed parallel to the speed-changing idle shaft 8 below the speed-changing idle shaft 8, and is offset to the left side (toward the second speed-change shaft 20) as viewed from the rear. First and second output idle gears 35, 36 are fixed to the output idle shaft 9. The first output idle gear 35 meshes with the third driven gear 28 of the speed-changing idle shaft 8.

Output Shaft

The output shaft 7 is rotatably supported by a pair of bearings in the housing 10 in the same manner as other shafts, and output flanges 40, 41 linked to an axle-side member are mounted on the two ends of the output shaft. The output shaft 7 is disposed parallel to the shafts, below the output idle shaft 9, and on the same perpendicular line as the input shaft 2 and the second speed-change shaft 20, as shown in FIG. 2. An output gear 42 is fixed to the output shaft 7, and the output gear 42 meshes with the second output idle gear 36 of the output idle shaft 9.

Clutch Mechanism

The clutch mechanism 5 has a first clutch pair 5F disposed coaxially with the input shaft 2, and a second clutch pair 5R disposed coaxially with the second transmission mechanism 4 and the second speed-change shaft 20.

First Clutch Pair: Forward Clutch & First Snap Clutch

The first clutch pair 5F has a forward clutch F that is engaged (power transmission state) during forward travel, and a first snap clutch SC1 for transmitting rotation to the first transmission mechanism 3, as shown in FIG. 3. The forward clutch F and the first snap clutch SC1 are both hydraulic multidisc clutches and are disposed coaxially with each other.

More specifically, the forward clutch F has a forward input gear FG nonrotatably fixed to the input shaft 2, a clutch case 45 provided so as to be able to rotate about the input shaft 2, and a plurality of clutch plates disposed between the forward input gear FG and the clutch case 45. The first snap clutch SC1 has a clutch case shared with the clutch case 45 of the forward clutch F, an intermediate gear 46 rotatably supported on the input shaft 2, and a plurality of clutch plates disposed between the clutch case 45 and the intermediate gear 46. The intermediate gear 46 has a first intermediate gear 46a disposed on the input side, and a second intermediate gear 46b disposed on the output side. The first intermediate gear 46a meshes with the first synchronizing gear 24a of the synchronizing mechanism 24, and the second intermediate gear 46b meshes with the second synchronizing gear 24b of the synchronizing mechanism 24. The first intermediate gear 46a and the second intermediate gear 46b are integrally formed. A clutch case gear 47 is formed on the end part of the output side (right side in FIG. 1) on the external periphery of the clutch case 45.

With such a configuration, power can be transmitted between the forward input gear FG (i.e., the input shaft 2) and the clutch case 45 by engaging the forward clutch F. Power can be transmitted between the clutch case 45 and the intermediate gear 46 by engaging the first snap clutch SC1.

Second Clutch Pair: Reverse Clutch & Second Snap Clutch

The second clutch pair 5R has a reverse clutch R that is engaged during reverse travel (power transmission state), and a second snap clutch SC2 for transmitting rotation to the second transmission mechanism 4, as shown in FIG. 3. The reverse clutch R and the second snap clutch SC2 are both hydraulic multidisc clutches and are disposed coaxially with each other.

More specifically, the reverse clutch R has a clutch shaft 48 disposed coaxially with the second speed-change shaft 20, a reverse input gear RG rotatably supported on the clutch shaft 48, a clutch case 49 provided so as to be able to rotate about the clutch shaft 48, and a plurality of clutch plates disposed between the reverse input gear RG and the clutch case 49. A spline hole is formed in the end part of the output side (right side of FIG. 1) of the clutch shaft 48, and a splined shaft formed at the distal end of the second speed-change shaft 20 is coupled to the spline hole. The reverse input gear RG is linked to the forward input gear FG via an idling gear IG (see FIGS. 2 and 3) rotatably supported in the housing 10. The second snap clutch SC2 has a clutch case shared with the clutch case 49 of the reverse clutch R, and a plurality of clutch plates disposed between the clutch case 49 and the clutch shaft 48. A clutch case gear 50 is formed on the end part of the output side (right side in FIG. 1) on the external periphery of the clutch case 45, and the clutch case gear 50 meshes with the clutch case gear 47 of the first snap clutch SC1.

In such a configuration, the reverse clutch R is engaged, whereby power can be transmitted between the reverse input gear RG (i.e., the input shaft 2) and the clutch case 49. The second snap clutch SC2 is engaged, whereby power can be transmitted between the clutch case 49 and the clutch shaft 48 (i.e., the second speed-change shaft 20).

Rotation Directions Switching Mechanism

The rotation direction switching mechanism 6 is a mechanism whereby the direction of rotation inputted to the first transmission mechanism 3 or second transmission mechanism 4 is set, by using the clutch mechanism 5, to the direction of rotation for forward travel and the direction of rotation for reverse travel in accordance with the switch between the forward and reverse travel. The rotation direction switching mechanism 6 has a first gear train 52 for inputting rotation of the same direction to the first clutch pair 5F and the second clutch pair 5R, a second gear train 53 for reversing the direction of rotational output of both the first clutch pair 5F and the second clutch pair 5R and transmitting the reversed rotational output to the counterpart side, and a third gear train 54 for reversing the direction of rotational output of the first clutch pair 5F and inputting the reversed rotational output to the first transmission mechanism 3, as shown in FIG. 3.

Specifically, the first gear train 52 is a gear train composed of the forward input gear FG, the idling gear IG, and the reverse input gear RG; the second gear train 53 is a gear train composed of the clutch case gear 47 of the first snap clutch SC1 and the clutch case gear 50 of the second snap clutch SC2; and the third gear train 54 is a gear train composed of the intermediate gear 46, and the reduction gear 16 provided to the first transmission mechanism 3.

Power Transmission Pathway: Input-Side Shared Pathway

Next, the power transmission pathway of the transmission configured as described above will be described. First described is the shared pathway for each speed-change step, i.e., the power transmission pathway from the input shaft 2 to the transmission mechanisms 3, 4.

Forward Clutch Engaged & First Snap Clutch Engaged

In a case in which the forward clutch F and the first snap clutch SC1 are engaged (the reverse clutch R and second snap clutch SC2 are disengaged), rotation from the input shaft 2 is transmitted to the intermediate gear 46 via the forward clutch F and the first snap clutch SC1, and is inputted to the first speed-change shaft 12 of the first transmission mechanism 3 via the reduction gear 16, which meshes with the intermediate gear 46.

The corresponding direction of rotation is the first direction for the input shaft 2 and the intermediate gear 46 when the direction of engine rotation is set as the first direction (the same applies for all directions hereinafter), and the direction of rotation of the first speed-change shaft 12 is the second direction (forward).

Forward Clutch Engaged & Second Snap Clutch Engaged

In a case in which the forward clutch F and the second snap clutch SC2 are engaged (the reverse clutch R and first snap clutch SC1 are disengaged), rotation from the input shaft 2 is transmitted to the clutch shaft 48 via the forward clutch F and the second snap clutch SC2, and is inputted to the second speed-change shaft 20 of the second transmission mechanism 4, which is spline linked with the clutch shaft 48.

Since the corresponding direction of rotation is the first direction for the input shaft 2 and the clutch case gear 47 of the first snap clutch SC1, the clutch shaft 48 and the clutch case gear 50 of the second snap clutch SC2 rotate in the second direction, and the direction of rotation of the second speed-change shaft 20 is the second direction (forward).

Reverse Clutch Engaged & First Snap Clutch Engaged

In a case in which the reverse clutch R and the first snap clutch SC1 are engaged (the forward clutch F and second snap clutch SC2 are disengaged), rotation from the input shaft 2 is transmitted to the reverse clutch R via the forward input gear FG, the idling gear IG, and the reverse input gear RG; and the rotation of the reverse clutch R is inputted to the first snap clutch SC1 via the meshing of the two clutch case gears 47, 50. The rotation is transmitted to the intermediate gear 46 and is further inputted to the first speed-change shaft 12 of the first transmission mechanism 3 via the reduction gear 16, which meshes with the intermediate gear 46.

Since the corresponding direction of rotation is the first direction for the input shaft 2, the clutch shaft 48 and the reverse clutch R (second snap clutch SC2) also rotate in the first direction. Therefore, the direction of rotation of the first snap clutch SC1 is the second direction. Accordingly, the direction of rotation of the first speed-change shaft 12 is the first direction (reverse).

Reverse Clutch Engaged & Second Snap Clutch Engaged

In a case in which the reverse clutch R and the second snap clutch SC2 are engaged (the forward clutch F and first snap clutch SC1 are disengaged), rotation from the input shaft 2 is inputted to the reverse clutch R via the forward input gear FG, the idling gear IG, and the reverse input gear RG. The rotation of the reverse clutch R is inputted to the clutch shaft 48 and the second speed-change shaft 20 of the input shaft 2 via the second snap clutch SC2.

Since the corresponding direction of rotation is the first direction for the input shaft 2, the clutch shaft 48 and the reverse clutch R (second snap clutch SC2) also rotate in the first direction. Therefore, the direction of rotation of the clutch shaft 48 and the second speed-change shaft 20 is the first direction (reverse).

Power Transmission Pathway: Each Speed-Changes Step

The speed of the rotation inputted to the first and second transmission mechanisms 3, 4 is thus changed in the manner described below for each speed-change step.

Forward First Speed

Figure 5:
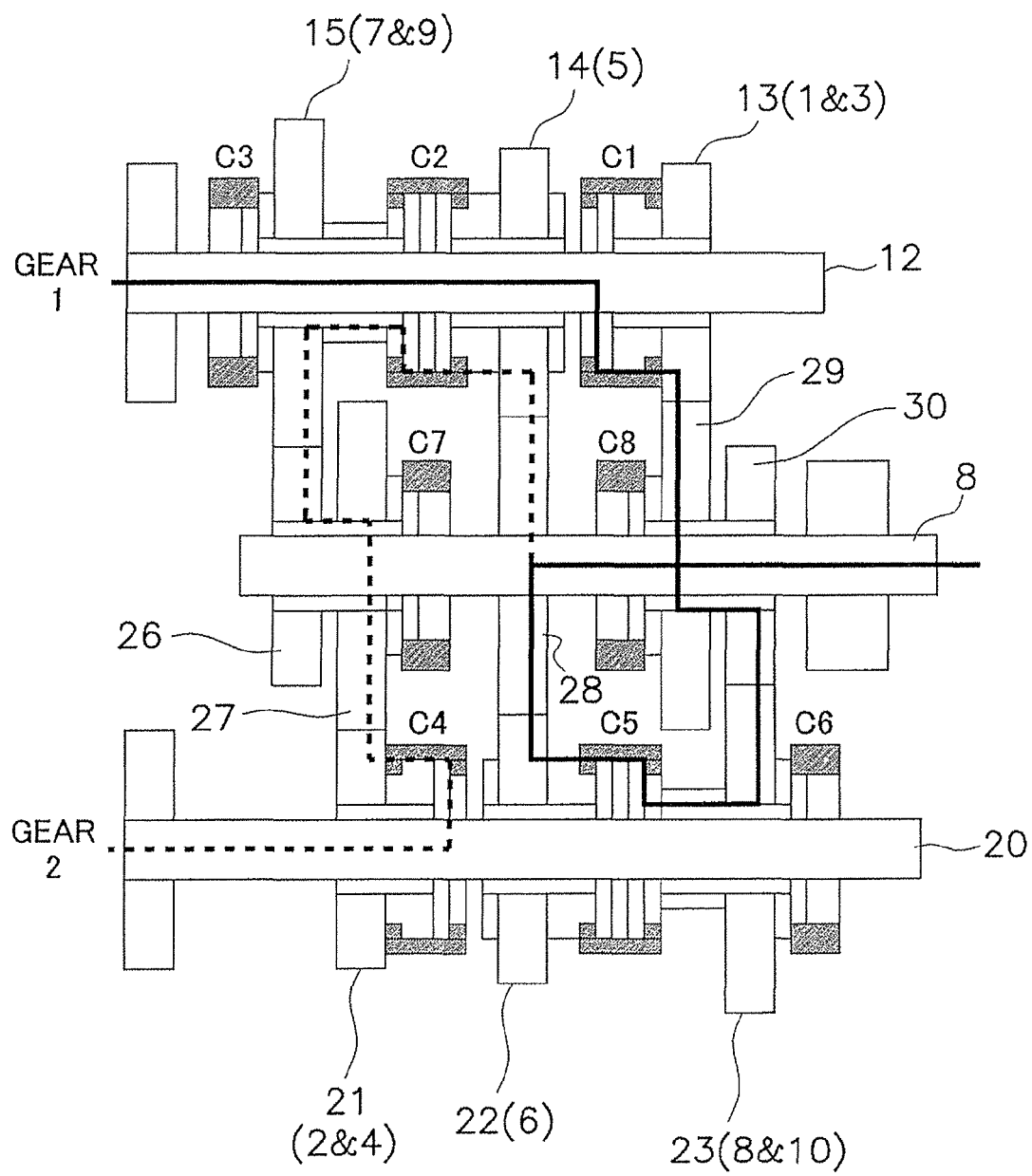
FIG. 5 is a schematic view showing the power transmission pathway in each speed-change step of the transmission.

In the case of the forward first speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward first speed, the dog clutches are controlled so that the following members are engaged (linked) with each other, as shown in FIG. 5.

First dog clutch C1: first speed-change shaft 12+1st- and 3rd-speed drive gears 13
Second dog clutch C2: 5th-speed drive gear 14+7th- and 9th-speed drive gears 15
Fourth dog clutch C4: second speed-change shaft 20+2nd- and 4th-speed drive gears 21
Fifth dog clutch C5: 6th-speed drive gear 22+8th- and 10th-speed drive gears 23
Other dog clutches: disengaged In this arrangement, the rotation inputted to the first speed-change shaft 12 is transmitted to the speed-changing idle shaft 8 via the pathway described below. The power transmission pathway is shown by a solid line in FIG. 5. The rotation transmission pathway of the second transmission mechanism 4 in this case is indicated by a dotted line. The pathway indicated by the dotted line is the rotation transmission pathway of second speed and indicates that pre-shifting has been performed.

First speed-change shaft 12→first dog clutch C1→1st- and 3rd-speed drive gears 13→fourth and fifth driven gears 29, 30→8th- and 10th-speed drive gears 23→fifth dog clutch C5→6th-speed drive gear 22→third driven gear 28→speed-changing idle shaft 8.

Forward Second Speed

Figure 6:
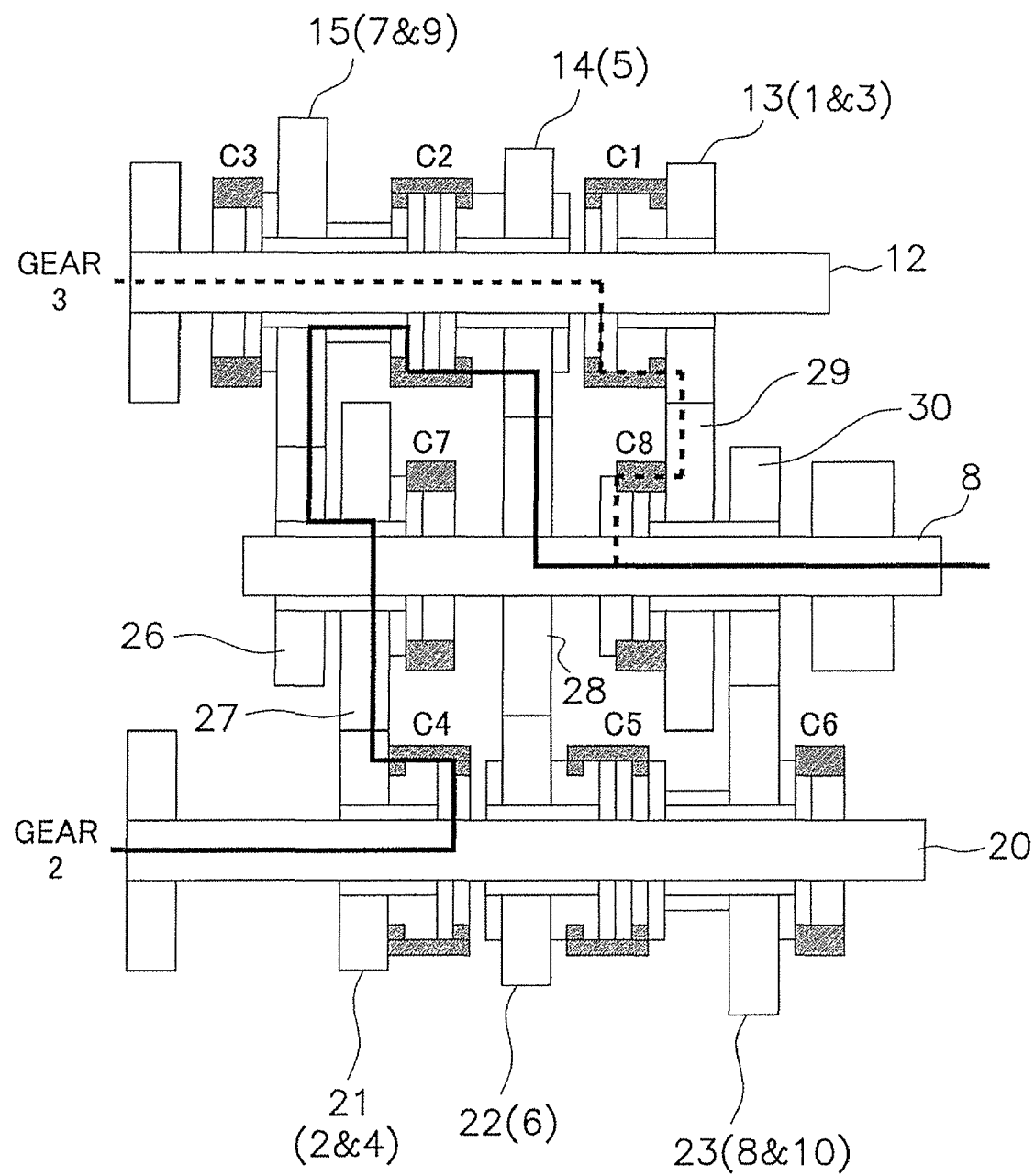
FIG. 6 is a schematic view showing the power transmission pathway in each speed-change step of the transmission.

In the case of the forward second speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward second speed, the dog clutches are controlled so that the following members are engaged (linked) with each other, as shown in FIG. 6.

First dog clutch C1: first speed-change shaft 12+1st- and 3rd-speed drive gears 13
Second dog clutch C2: 5th-speed drive gear 14+7th- and 9th-speed drive gears 15
Fourth dog clutch C4: second speed-change shaft 20+2nd- and 4th-speed drive gears 21
Eighth dog clutch C8: fourth driven gear 29+speed-changing idle shaft 8
Other dog clutches: disengaged In this arrangement, the rotation inputted to the second speed-change shaft 20 is transmitted to the speed-changing idle shaft 8 via the following pathway. The power transmission pathway is shown by a solid line in FIG. 6. The rotation transmission pathway of the first transmission mechanism 3 in this case is indicated by a dotted line. The pathway indicated by the dotted line is the rotation transmission pathway of third speed and indicates that pre-shifting has been performed.

Second speed-change shaft 20→fourth dog clutch C4→2nd- and 4th-speed drive gears 21→first and second driven gears 26, 27→7th- and 9th-speed drive gears 15→second dog clutch C2→5th-speed drive gear 14→third driven gear 28→speed-changing idle shaft 8.

Forward Third Speed

Figure 7:
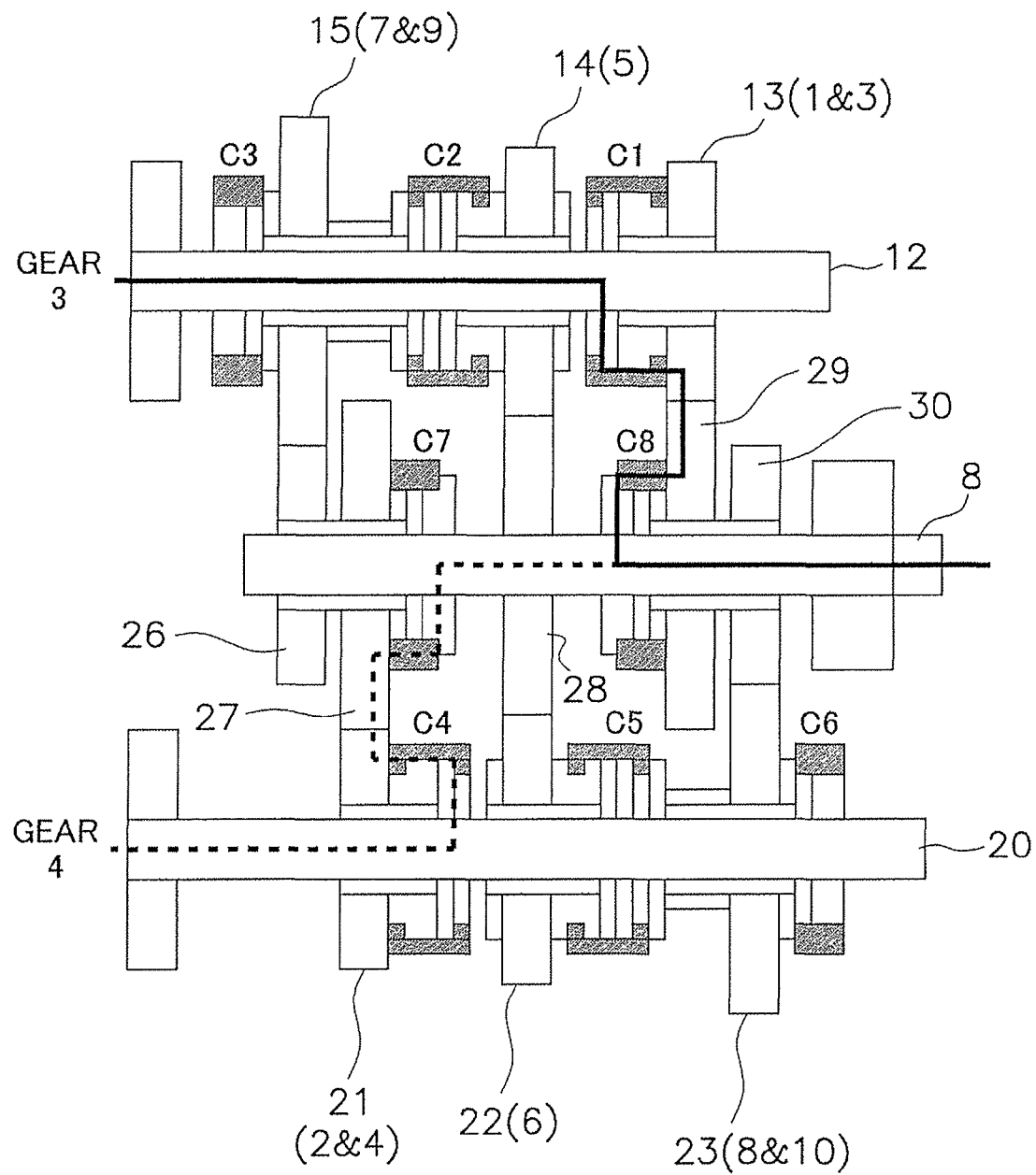
FIG. 7 is a schematic view showing the power transmission pathway in each speed-change step of the transmission.

In the case of the forward third speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward third speed, the dog clutches are controlled so that the following members are engaged (linked) with each other, as shown in FIG. 7.
First dog clutch C1: first speed-change shaft 12+1st- and 3rd-speed drive gears 13
Fourth dog clutch C4: second speed-change shaft 20+2nd- and 4th-speed drive gears 21
Seventh dog clutch C7: second driven gear 27+speed-changing idle shaft 8
Eighth dog clutch C8: fourth driven gear 29+speed-changing idle shaft 8
Other dog clutches: disengaged
In this arrangement, the rotation inputted to the first speed-change shaft 12 is transmitted to the speed-changing idle shaft 8 via the following pathway. The power transmission pathway is shown by a solid line in FIG. 7. The rotation transmission pathway of the second transmission mechanism 4 in this case is indicated by a dotted line. The pathway indicated by the dotted line is the rotation transmission pathway of fourth speed and indicates that pre-shifting has been performed.
First speed-change shaft 12→first dog clutch C1→1st- and 3rd-speed drive gears 13→fourth driven gear 29→eighth dog clutch C8→speed-changing idle shaft 8.

Forward Fourth Speed

Figure 8:
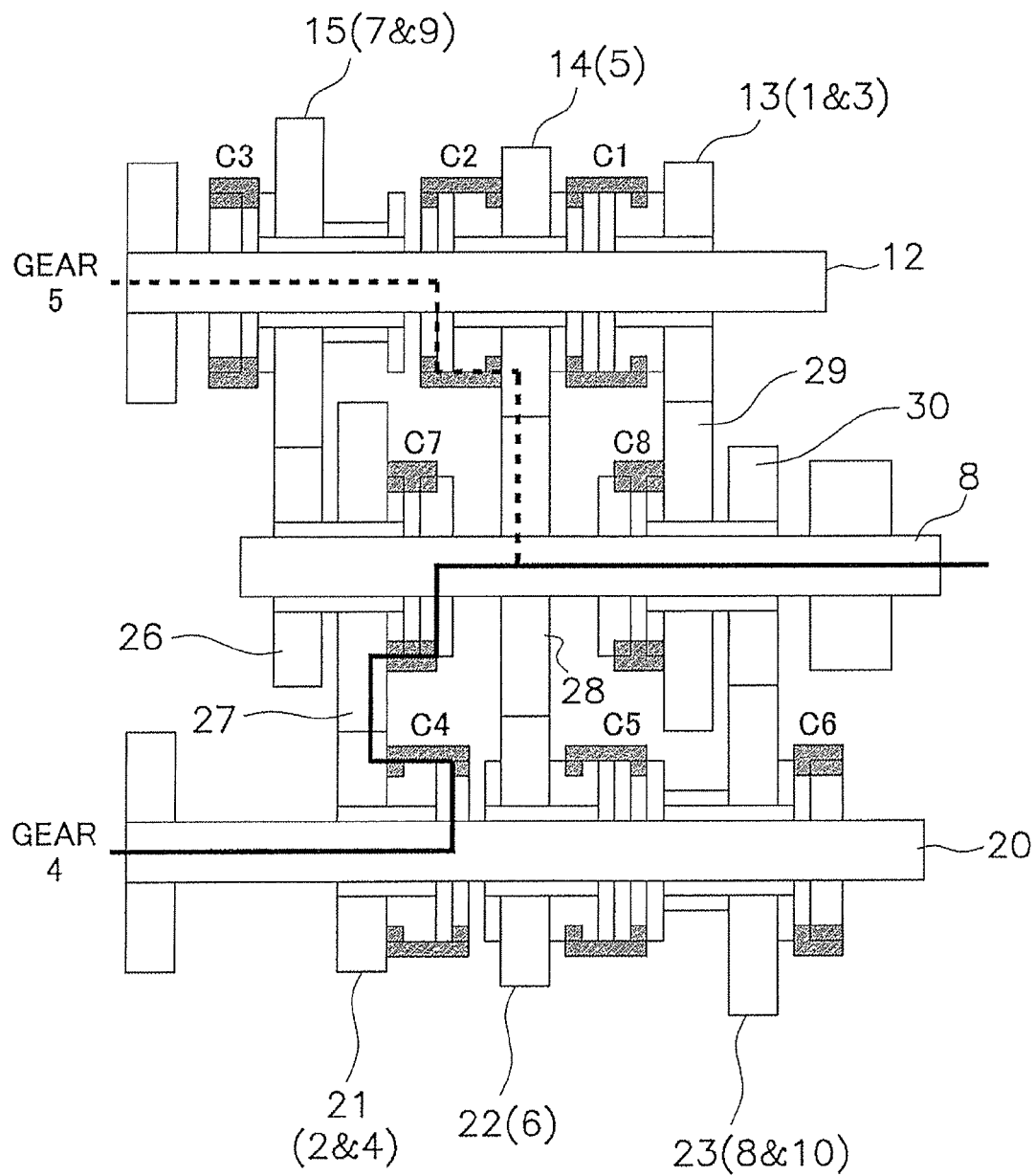
FIG. 8 is a schematic view showing the power transmission pathway in each speed-change step of the transmission.

In the case of the forward fourth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward fourth speed, the dog clutches are controlled so that the following members are engaged (linked) with each other, as shown in FIG. 8.
Second dog clutch C2: first speed-change shaft 12+5th-speed drive gear 14
Fourth dog clutch C4: second speed-change shaft 20+2nd- and 4th-speed drive gears 21
Seventh dog clutch C7: second driven gear 27+speed-changing idle shaft 8
Other dog clutches: disengaged
In this arrangement, the rotation inputted to the second speed-change shaft 20 is transmitted to the speed-changing idle shaft 8 via the following pathway. The power transmission pathway is shown by a solid line in FIG. 8. The rotation transmission pathway of the first transmission mechanism 3 in this case is indicated by a dotted line. The pathway indicated by the dotted line is the rotation transmission pathway of fifth speed and indicates that pre-shifting has been performed.
Second speed-change shaft 20→fourth dog clutch C4→2nd- and 4th-speed drive gears 21→second driven gear 27→seventh dog clutch C7→speed-changing idle shaft 8.

Forward Fifth Speed

Figure 9:
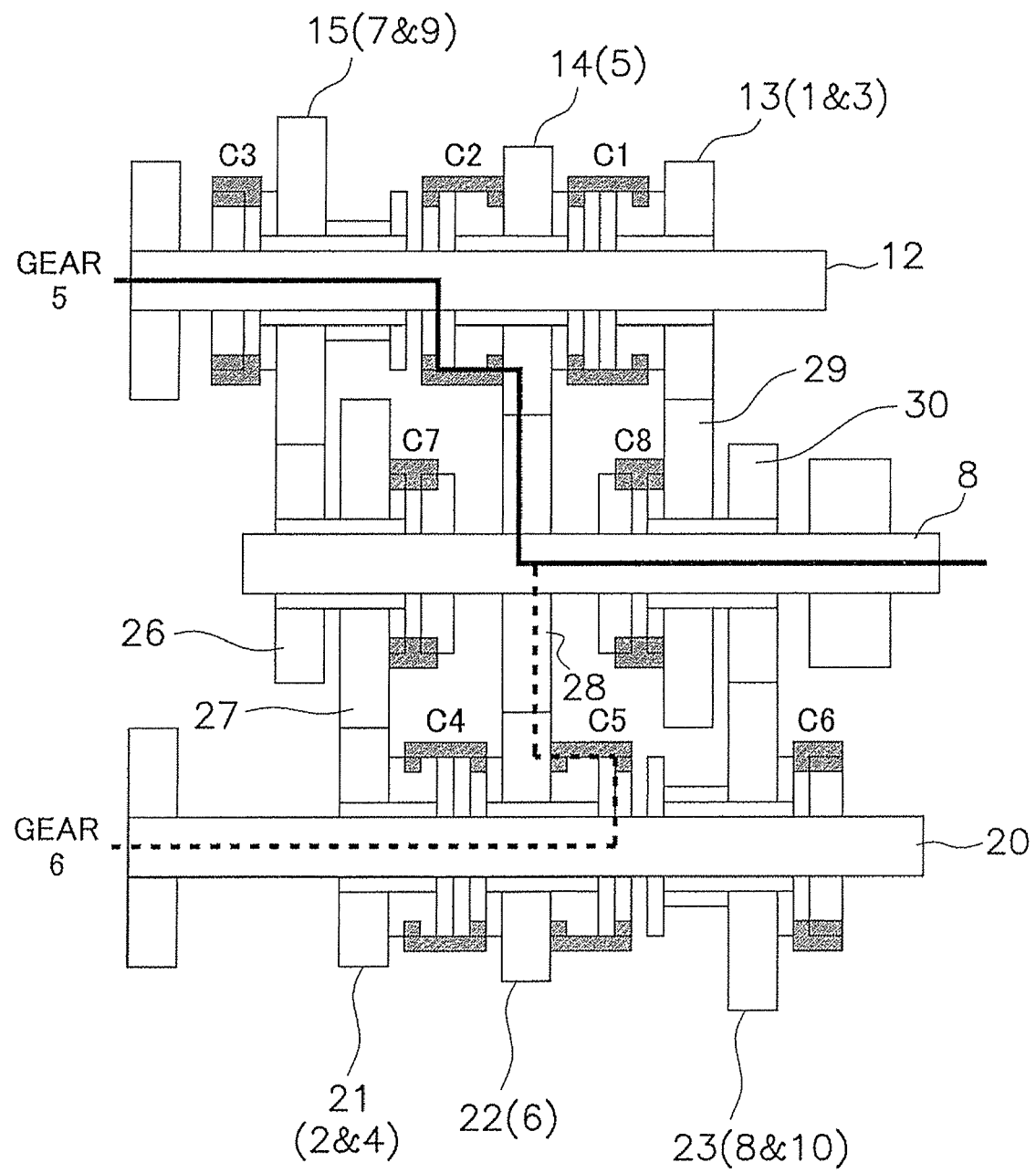
FIG. 9 is a schematic view showing the power transmission pathway in each speed-change step of the transmission.

In the case of the forward fifth speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward fifth speed, the dog clutches are controlled so that the following members are engaged (linked) with each other, as shown in FIG. 9.
Second dog clutch C2: first speed-change shaft 12+5th-speed drive gear 14
Fifth dog clutch C5: second speed-change shaft 20+6th-speed drive gear 22
Other dog clutches: disengaged
In this arrangement, the rotation inputted to the first speed-change shaft 12 is transmitted to the speed-changing idle shaft 8 via the following pathway. The power transmission pathway is shown by a solid line in FIG. 9. The rotation transmission pathway of the second transmission mechanism 4 in this case is indicated by a dotted line. The pathway indicated by the dotted line is the rotation transmission pathway of sixth speed and indicates that pre-shifting has been performed.
First speed-change shaft 12→second dog clutch C2→5th-speed drive gear 14→third driven gear 28→speed-changing idle shaft 8.

Forward Sixth Speed

Figure 10:
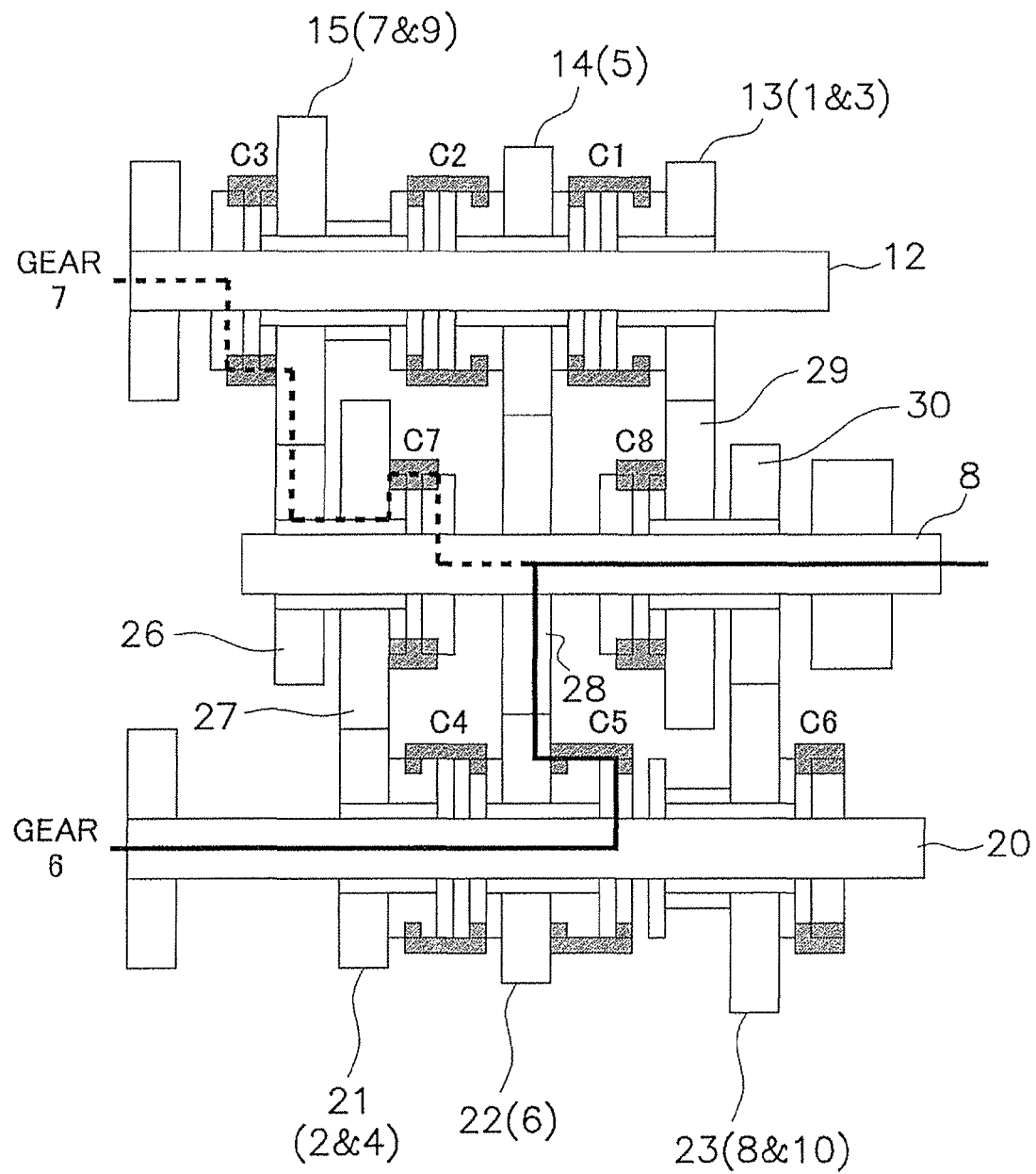
FIG. 10 is a schematic view showing the power transmission pathway in each speed-change step of the transmission.

In the case of the forward sixth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward sixth speed, the dog clutches are controlled so that the following members are engaged (linked) with each other, as shown in FIG. 10.
Third dog clutch C3: first speed-change shaft 12+7th- and 9th-speed drive gears 15
Fifth dog clutch C5: second speed-change shaft 20+6th-speed drive gear 22
Seventh dog clutch C7: first and second driven gears 26, 27+speed-changing idle shaft 8
Other dog clutches: disengaged
In this arrangement, the rotation inputted to the second speed-change shaft 20 is transmitted to the speed-changing idle shaft 8 via the following pathway. The power transmission pathway is shown by a solid line in FIG. 10. The rotation transmission pathway of the first transmission mechanism 3 in this case is indicated by a dotted line. The pathway indicated by the dotted line is the rotation transmission pathway of seventh speed and indicates that pre-shifting has been performed.
Second speed-change shaft 20→fifth dog clutch C5→6th-speed drive gear 22→third driven gear 28→speed-changing idle shaft 8.

Forward Seventh Speed

Figure 11:
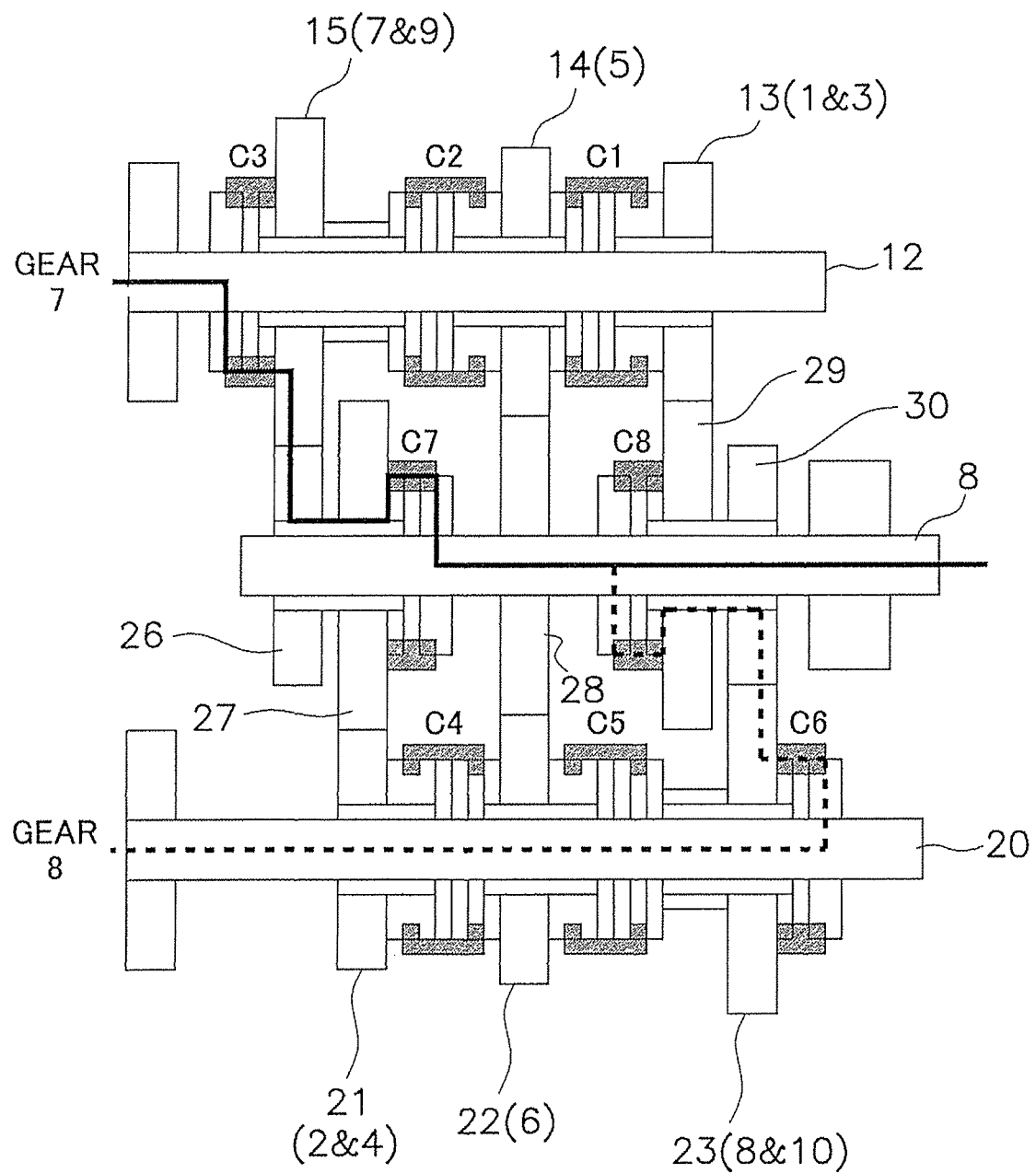
FIG. 11 is a schematic view showing the power transmission pathway in each speed-change step of the transmission.

In the case of the forward seventh speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward seventh speed, the dog clutches are controlled so that the following members are engaged (linked) with each other, as shown in FIG. 11.
Third dog clutch C3: first speed-change shaft 12+7th- and 9th-speed drive gears 15

Sixth dog clutch C6: second speed-change shaft 20+8th- and 10th-speed drive gears 23

Seventh dog clutch C7: first and second driven gears 26, 27+speed-changing idle shaft 8

Other dog clutches: disengaged

In this arrangement, the rotation inputted to the first speed-change shaft 12 is transmitted to the speed-changing idle shaft 8 via the following pathway. The power transmission pathway is shown by a solid line in FIG. 11. The rotation transmission pathway of the second transmission mechanism 4 in this case is indicated by a dotted line. The pathway indicated by the dotted line is the rotation transmission pathway of eighth speed and indicates that pre-shifting has been performed.

First speed-change shaft 12→third dog clutch C3→7th- and 9th-speed drive gears 15→first and second driven gears 26, 27→seventh dog clutch C7→speed-changing idle shaft 8.

Forward Eight Speed

Figure 12:
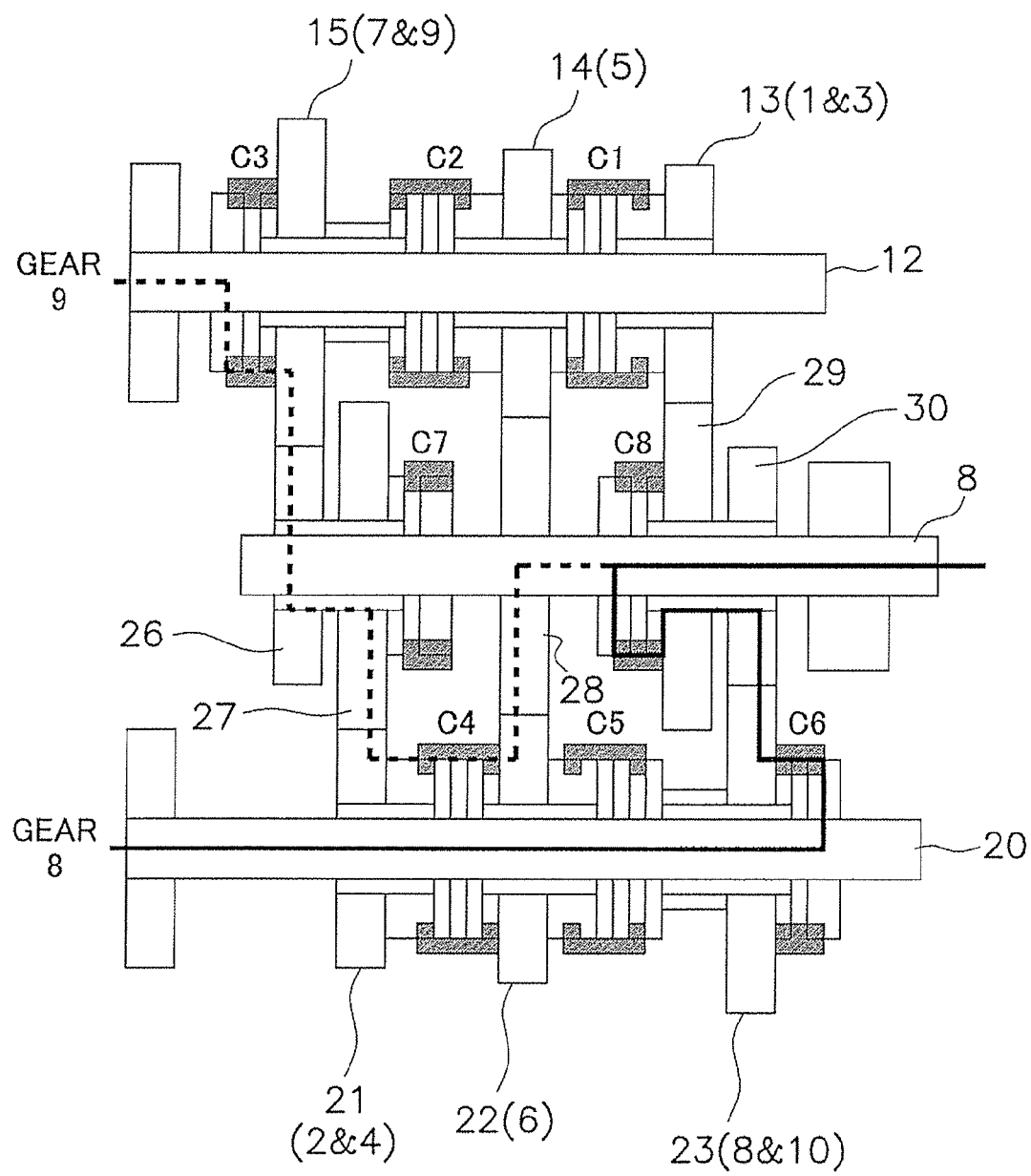
FIG. 12 is a schematic view showing the power transmission pathway in each speed-change step of the transmission.

In the case of the forward eighth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward eighth speed, the dog clutches are controlled so that the following members are engaged (linked) with each other, as shown in FIG. 12.

Third dog clutch C3: first speed-change shaft 12+7th- and 9th-speed drive gears 15

Fourth dog clutch C4: 2nd- and 4th-speed drive gears 21+6th-speed drive gear 22

Sixth dog clutch C6: second speed-change shaft 20+8th- and 10th-speed drive gears 23

Eighth dog clutch C8: fourth and fifth driven gears 29, 30+speed-changing idle shaft 8

Other dog clutches: disengaged

In this arrangement, the rotation inputted to the second speed-change shaft 20 is transmitted to the speed-changing idle shaft 8 via the following pathway. The power transmission pathway is shown by a solid line in FIG. 12. The rotation transmission pathway of the first transmission mechanism 3 in this case is indicated by a dotted line. The pathway indicated by the dotted line is the rotation transmission pathway of ninth speed and indicates that pre-shifting has been performed.

Second speed-change shaft 20→sixth dog clutch C6→8th- and 10th-speed drive gears 23→fourth and fifth driven gears 29, 30→eighth dog clutch C8→speed-changing idle shaft 8.

Forward Ninth Speed

Figure 13:
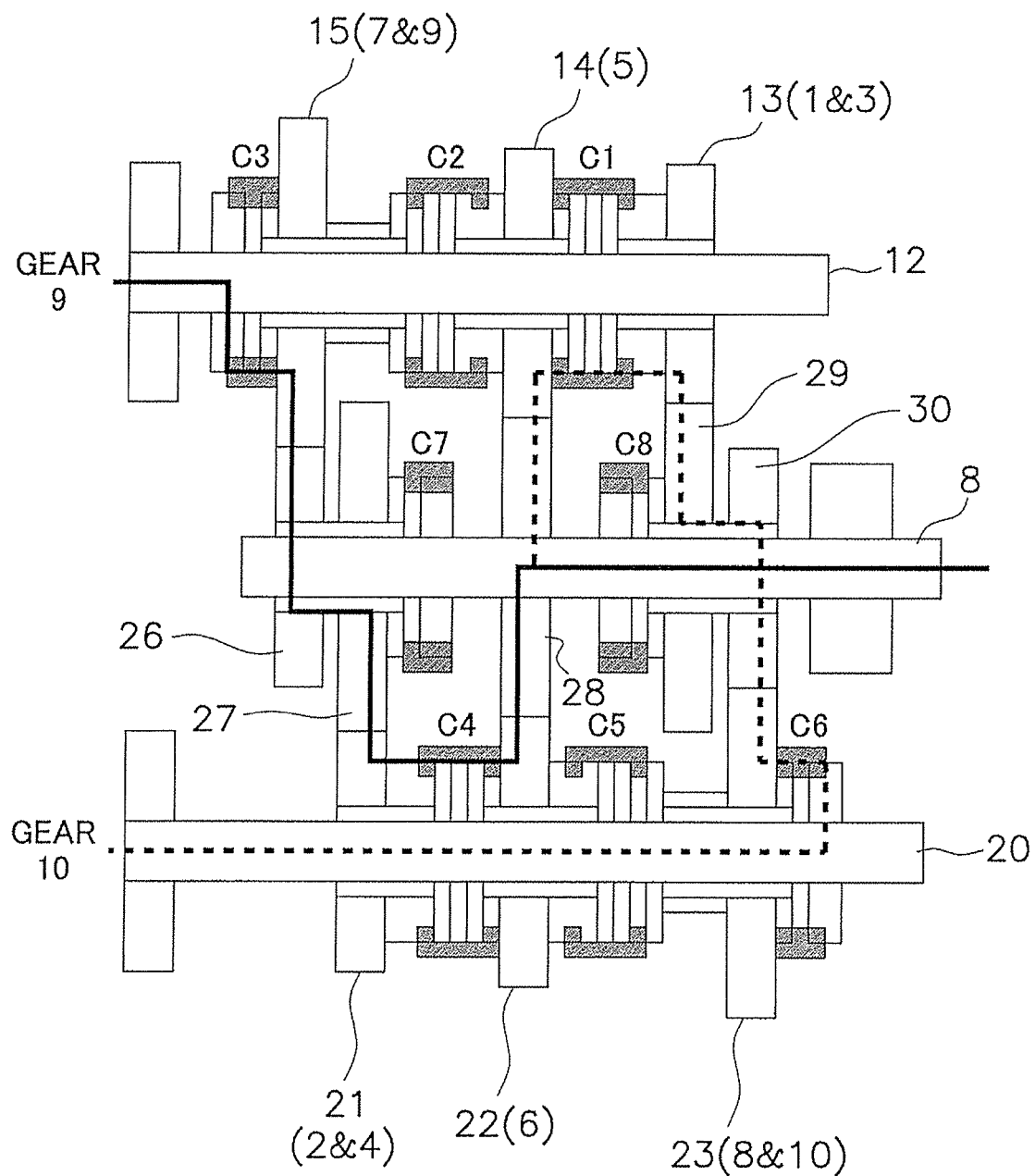
FIG. 13 is a schematic view showing the power transmission pathway in each speed-change step of the transmission.

In the case of the forward ninth speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward ninth speed, the dog clutches are controlled so that the following members are engaged (linked) with each other, as shown in FIG. 13.

First dog clutch C1: 1st- and 3rd-speed drive gears 13+5th-speed drive gear 14

Third dog clutch C3: first speed-change shaft 12+7th- and 9th-speed drive gears 15

Fourth dog clutch C4: 2nd- and 4th-speed drive gears 21+6th-speed drive gear 22

Sixth dog clutch C6: second speed-change shaft 20+8th- and 10th-speed drive gears 23

Other dog clutches: disengaged

In this arrangement, the rotation inputted to the first speed-change shaft 12 is transmitted to the speed-changing idle shaft 8 via the following pathway. The power transmission pathway is shown by a solid line in FIG. 13. The rotation transmission pathway of the second transmission mechanism 4 in this case is indicated by a dotted line. The pathway indicated by the dotted line is the rotation transmission pathway of tenth speed and indicates that pre-shifting has been performed.

First speed-change shaft 12→third dog clutch C3→7th- and 9th-speed drive gears 15→first and second driven gears 26, 27→2nd- and 4th-speed drive gears 21→fourth dog clutch C4→6th-speed drive gear 22→third driven gear 28→speed-changing idle shaft 8.

Forward Tenth Gear

In the case of the forward tenth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward tenth speed, the dog clutches are engaged and disengaged in the same manner as forward ninth gear.

In this arrangement, the rotation inputted to the second speed-change shaft 20 is transmitted to the speed-changing idle shaft 8 via the following pathway. The rotation transmission pathway of the first transmission mechanism 3 in this case is the same as that of forward ninth gear.

Second speed-change shaft 20→sixth dog clutch C6→8th- and 10th-speed drive gears 23→fourth and fifth driven gears 29, 30→1st- and 3rd-speed drive gears 13→first dog clutch C1→5th-speed drive gear 14→third driven gear 28→speed-changing idle shaft 8.

Reverse 1st Through 10th Speeds

In the case of reverse travel, the situation is different in that the forward clutch F is disengaged and the reverse clutch R is engaged. Therefore, in the case of reverse travel, rotation in the opposite direction of that of forward travel is inputted to the first speed-change shaft 12 and the second speed-change shaft 20, but control of the dog clutches and the power transmission pathway at each speed step is exactly the same as that that of each speed-change step for forward travel.

Power Transmission Pathway: Output-Side Shared Pathway

The rotation outputted to the speed-changing idle shaft 8 in each speed-change step in the manner described above is transmitted to the output gear 42 via the first output idle gear 35, the output idle shaft 9, and the second output idle gear 36, and is further outputted to the axle via the output shaft 7 and the output flanges 40, 41. The first output idle gear 35 meshes with the third driven gear 28 of the speed-changing idle shaft 8.

Concerning Synchronization During Speed Change

In the present embodiment, rotation is inputted to the first transmission mechanism 3 in odd-numbered speed-change steps, and rotation is inputted to the second transmission mechanism 4 in even-numbered speed-change steps, as described above. Pre-shifting is carried out in the transmission mechanism for moving to the next speed-change step when the speed is changed one speed at a time, and the dog clutches are smoothly meshed using the synchronizing mechanism 24 when a speed change is made to the next speed-change step.

The pre-shift operation will be described below with reference to FIG. 6 using, e.g., the case in which the speed is changed from sixth speed to fifth speed and then to fourth speed.

Figure 14:
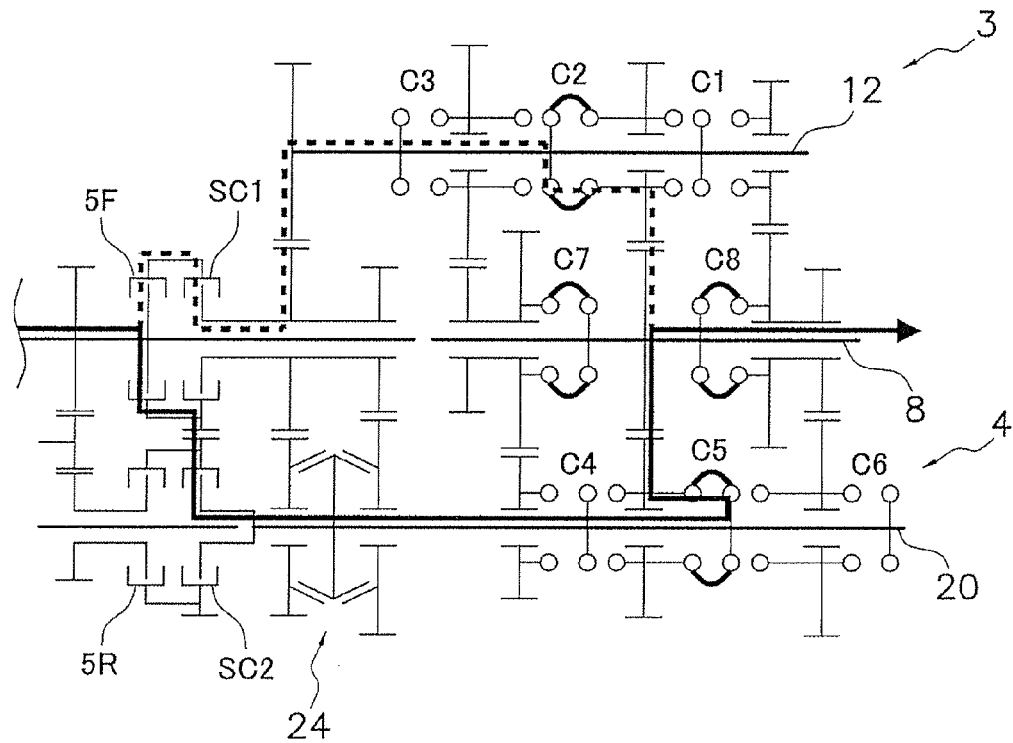
FIG. 14 is a view showing the operation during speed change of the transmission.
Figure 15:
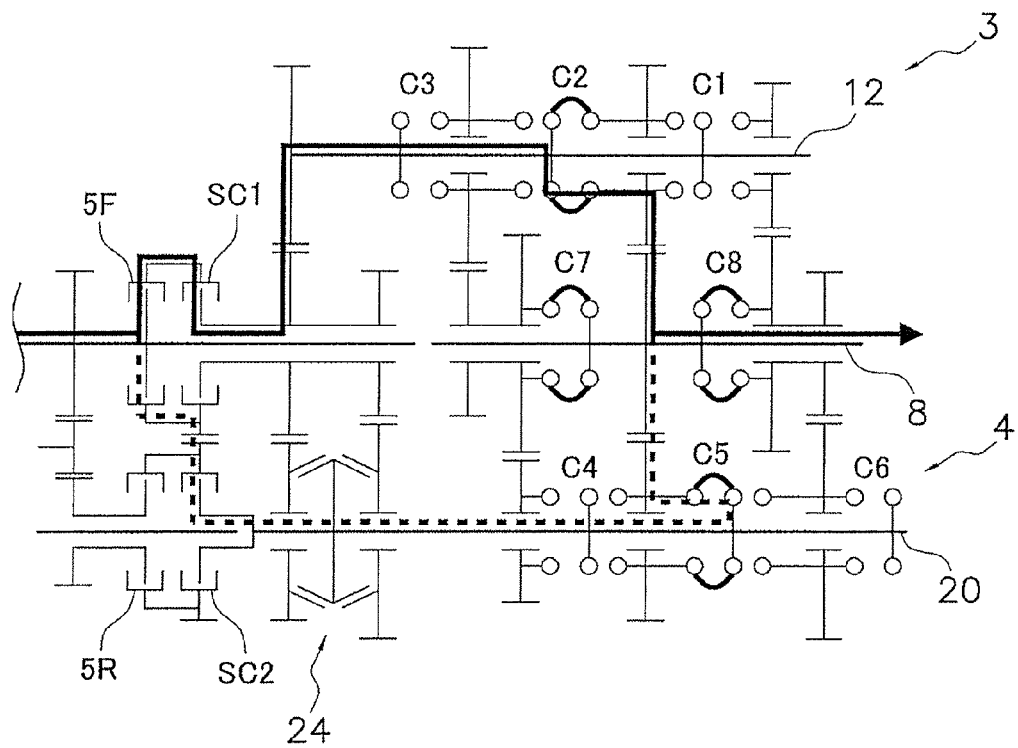
FIG. 15 is a view showing the operation during speed change of the transmission.

In sixth speed, power is transmitted along a pathway such as that shown by the solid line of FIG. 14 (same as FIG. 9). In the sixth speed, the rotation transmission pathway (the pathway indicated by the dotted line in FIG. 14) of fifth speed is prepared by the first transmission mechanism 3. In other words, a pre-shift is performed. Therefore, a speed change can be executed by merely disengaging the second snap clutch SC2 and engaging the first snap clutch SC1 when a change is made from sixth speed to fifth speed. The rotation transmission pathway in fifth speed is shown by a solid line in FIG. 15.

Figure 16:
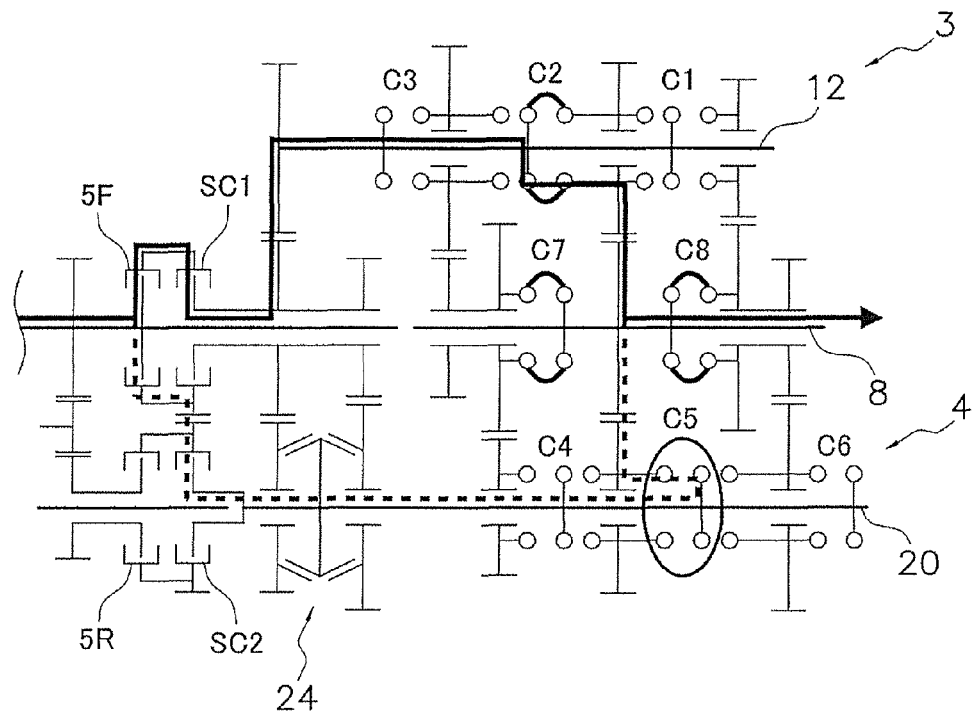
FIG. 16 is a view showing the operation during speed change of the transmission.
Figure 17:
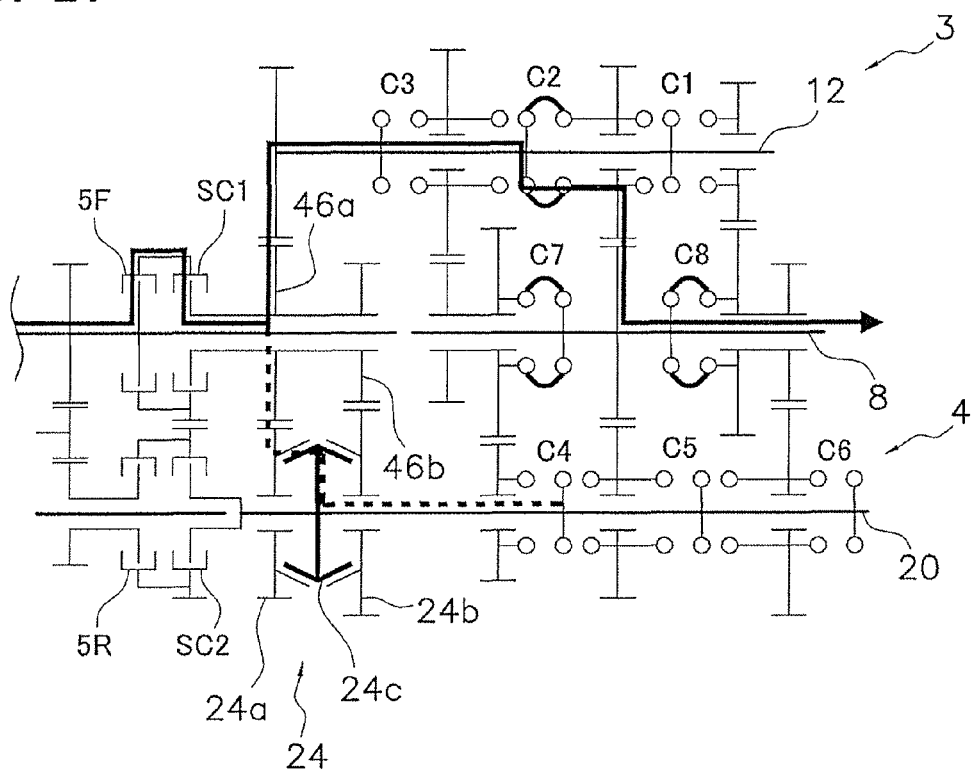
FIG. 17 is a view showing the operation during speed change of the transmission.

Next, the synchronizing mechanism 24 must perform synchronization when the speed is changed from fifth speed to fourth speed. In this situation, the fifth dog clutch C5 that had been linking the second speed-change shaft 20 and the 6th-speed drive gear 22 is first disengaged when fifth speed is selected, as shown in FIG. 16. The cone clutch 24c of the synchronizing mechanism 24 is thereafter moved to the input side, as shown in FIG. 17, and the second speed-change shaft 20 and the first synchronizing gear 24a are momentarily linked. At this point, the first synchronizing gear 24a is meshing with the first intermediate gear 46a, and the rotation of the first transmission mechanism 3 is therefore transmitted to the second speed-change shaft 20 via the first intermediate gear 46a and the first synchronizing gear 24a. Here, each speed-change step is set so that the difference in step intervals between the speeds is constant, and the difference in step interval is set by the gear ratio between the first intermediate gear 46a and the first synchronizing gear 24a, or by the number of gear teeth of the gears so as to establish the same gear ratio as the gear ratio between the second intermediate gear 46b and the second synchronizing gear 24b. Therefore, the fifth dog clutch C5 is disengaged and the synchronizing mechanism 24 is momentarily engaged in the state in which the fifth speed has been selected, whereby the rotational speed of the second speed-change shaft 20 is brought to the same or nearly the same level as the rotational speed maintained when the fourth speed has been selected.

Figure 18:
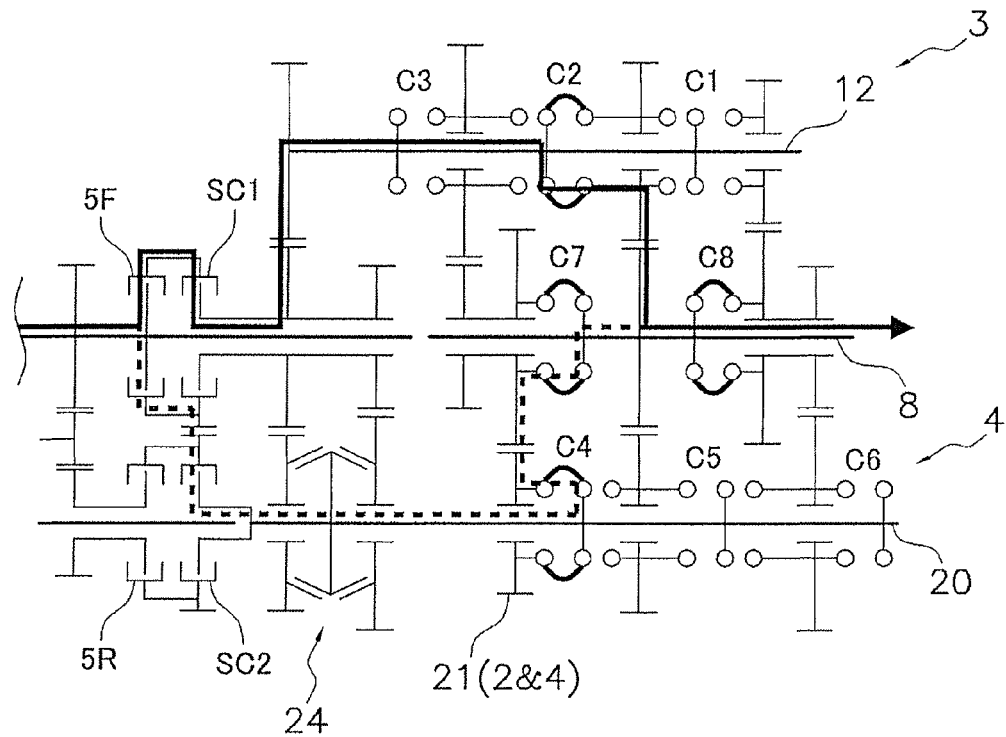
FIG. 18 is a view showing the operation during speed change of the transmission.
Figure 19:
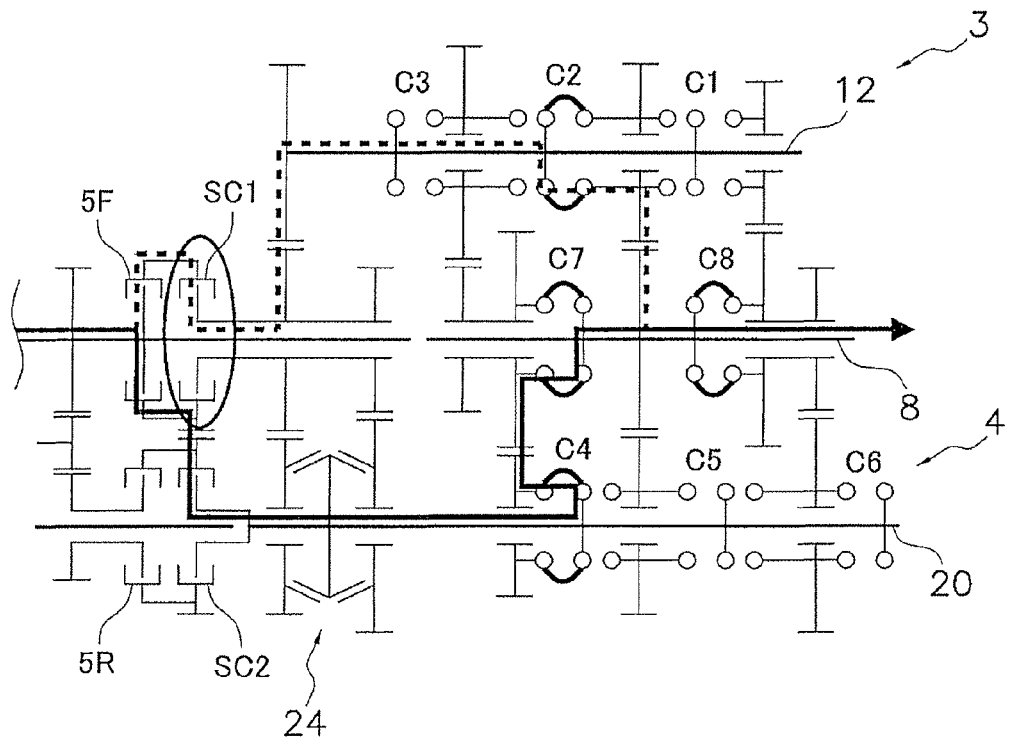
FIG. 19 is a view showing the operation during speed change of the transmission.

After such synchronization has been carried out, the fourth dog clutch C4 is engaged, and the second speed-change shaft 20 and the 2nd- and 4th-speed drive gears 21 are linked, as shown in FIG. 18 (the synchronizing mechanism 24 is already off). At this point, the fourth dog clutch C4 can be made to smoothly mesh because the rotational speed of the second speed-change shaft 20 is controlled by the synchronization carried out by the synchronizing mechanism 24 as described above. The first snap clutch SC1 is subsequently disengaged and the second snap clutch SC2 is engaged, as shown in FIG. 19. Power is thereby transmitted via the pathway shown by the solid line in FIG. 19, and the change to fourth speed is completed.

Synchronization is carried out by essentially the same operation as that described above during other speed change operations, and smooth speed changing is made possible.

Effects of the Present Embodiment

With this device, ten speed-change steps can be obtained during forward travel as well as during reverse travel using a single set of transmission mechanisms 3, 4 by providing the pre-stage of the transmission mechanism with two snap clutches SC1, SC2 and a single pair of clutches F, R for switching between forward and reverse travel.

In this case, it is also possible to consider providing the pre-stage of the transmission mechanism with a planetary gear mechanism for switching the direction of rotation as a mechanism for obtaining a plurality of speed-change steps in forward and reverse travel, but the present embodiment provides a configuration in which less space can be used in the axial direction and the size of the overall device can be reduced in comparison with the case in which a planetary gear mechanism is provided. This device can be made the same size as a conventional transmission without increasing the size in the lateral and vertical directions (the directions orthogonal to the shafts). In other words, a conventional transmission has an input shaft, a first speed-change shaft, and a second speed-change shaft, and each of the shafts has a hydraulic clutch. In the present device, however, space in the lateral and vertical directions is not increased because the input shaft and the second speed-change shaft are each merely provided with a coaxially disposed clutch mechanism.

Since the first and second transmission mechanisms 3, 4 are configured using dog clutches rather than hydraulic clutches such as in a conventional device, the configuration is simplified in comparison with a conventional transmission.

In the present embodiment, each forward and reverse speed-change step can be smoothly and rapidly changed because pre-shifting is performed during each speed change, and synchronization is carried out by the synchronizing mechanism 24.

In this device, the forward clutch F and the first snap clutch SC1 are coaxially arranged as the first clutch pair 5F, and the reverse clutch R and the second snap clutch SC2 are coaxially arranged as the second clutch pair 5R. Therefore, the clutch case as a component of the clutches can be shared and the configuration can be simplified.

In this device, the engine and the transmission are linked using a hydraulic clutch rather than a torque converter. Therefore, the power of the engine can be transmitted with good efficiency.

Other Embodiments (a) In the embodiment described above, an example of ten steps in forward and reverse travel was described, but the number of speed-change steps is not limited to the one specified in the embodiment.

(b) The presence of a synchronizing mechanism and the configuration of the clutches including the dog clutches are not limited to those specified in the embodiment described above.

(c) In the embodiment described above, the forward clutch F and the first snap clutch SC1 are coaxially arranged, and the reverse clutch R and the second snap clutch SC2 are coaxially arranged, but any combination of these may be selected.

(d) In the embodiment described above, the first clutch pair 5F is disposed coaxially with the input shaft 2, and the second clutch pair 5R is disposed coaxially with the second speed-change shaft 20, but the configuration of the present invention is not limited to this option alone. For example, the second clutch pair 5R may be disposed coaxially with the input shaft, and the first clutch pair 5F may be disposed coaxially with the first speed-change shaft 12 or the second speed-change shaft 20.

In accordance with the embodiments described above, a transmission for an industrial vehicle that has a simple configuration and good efficiency can be obtained.

The invention claimed is:

1. A transmission for an industrial vehicle adapted to output rotation from an engine while enabling multiple speed changes during forward and reverse travel, the transmission for an industrial vehicle comprising:
    an input shaft to which rotation from the engine is inputted;
    a first transmission mechanism configured and arranged to change the speed of rotation from the input shaft among a plurality of speed steps;
    a second transmission mechanism, provided in parallel to the first transmission mechanism, configured and arranged to change the speed of rotation from the input shaft among a plurality of speed steps;
    a clutch mechanism disposed on an input side of the first and second transmission mechanisms and provided with a forward clutch and a reverse clutch for switching between a forward travel state and a reverse travel state, a first snap clutch for inputting the rotation from the engine to the first transmission mechanism, and a second snap clutch for inputting the rotation from the engine to the second transmission mechanism;
    a rotation direction switching mechanism configured and arranged to switch a direction of rotation inputted to the first transmission mechanism or the second transmission mechanism to one of a direction of rotation for forward travel and a direction of rotation for reverse travel in accordance with the switch between the forward and reverse travel states by using the forward clutch and the reverse clutch,
    an output shaft configured and arranged to output the rotation inputted from the first and second transmission mechanisms,
    one of the forward clutch and the reverse clutch, and one of the first snap clutch and the second snap clutch, being coaxially arranged as a first clutch pair; and
    the other of the forward clutch and the reverse clutch, and the other of the first snap clutch and the second snap clutch, being coaxially arranged as a second clutch pair,
    the first and second transmission mechanisms having first and second speed-change shafts, respectively, arranged parallel to the input shaft,
    one of the first and second clutch pairs being arranged coaxially with the input shaft,
    the other of the first and second clutch pairs being arranged coaxially with one of the first speed-change shaft and the second speed-change shaft, and
    the rotation direction switching mechanism having
        a first gear train configured and arranged to input rotation to the first clutch pair and the second clutch pair in the same direction;
        a second gear train configured and arranged to transmit output between the first clutch pair and the second clutch pair so that the first clutch pair and the second clutch pair rotate in opposite directions; and
        a third gear train configured and arranged to transmit the output of the one of the first and second clutch pairs that is arranged coaxially with the input shaft to the other of the first and second speed-change shafts that is not coaxial with the other of the first and second clutch pairs so that the other of the first and second speed-change shafts rotates in an opposite direction from the one of the first and second clutch pairs.

2. A transmission for an industrial vehicle adapted to output rotation from an engine while enabling multiple speed changes during forward and reverse travel, the transmission for an industrial vehicle comprising:
    an input shaft to which rotation from the engine is inputted;
    a first transmission mechanism including a plurality of gears and a plurality of clutches, and configured and arranged to change the speed of rotation from the input shaft among a plurality of speed steps;
    a second transmission mechanism, provided in parallel to the first transmission mechanism, including a plurality of gears and a plurality of clutches, and configured and arranged to change the speed of rotation from the input shaft among a plurality of speed steps;
    a clutch mechanism disposed on an input side of the first and second transmission mechanisms and provided with a forward clutch and a reverse clutch for switching between a forward travel state and a reverse travel state a first snap clutch for inputting the rotation from the engine to the first transmission mechanism, and a second snap clutch for inputting the rotation from the engine to the second transmission mechanism;
    a rotation direction switching mechanism configured and arranged to switch a direction of rotation inputted to the first transmission mechanism or the second transmission mechanism to one of a direction of rotation for forward travel and a direction of rotation for reverse travel in accordance with the switch between the forward and reverse travel states by using the forward clutch and the reverse clutch; and
    an output shaft configured and arranged to output the rotation inputted from the first and second transmission mechanisms,
    one of the forward clutch and the reverse clutch, and one of the first snap clutch and the second snap clutch, being coaxially arranged as a first clutch pair, and
    the other of the forward clutch and the reverse clutch, and the other of the first snap clutch and the second snap clutch, being coaxially arranged as a second clutch pair.

3. The transmission for an industrial vehicle recited in claim 2, wherein
    the first and second transmission mechanisms have first and second speed-change shafts, respectively, arranged parallel to the input shaft;
    one of the first and second clutch pairs is arranged coaxially with the input shaft; and
    the other of the first and second clutch pairs is arranged coaxially with one of the first speed-change shaft and the second speed-change shaft.

4. The transmission for an industrial vehicle as recited in claim 2, further comprising
    a main clutch device, disposed between the engine and the clutch mechanism, configured and arranged to transmit the rotation from the engine to the input shaft.

* * * * *